United States Patent
Inoue et al.

(10) Patent No.: US 7,653,796 B2
(45) Date of Patent: Jan. 26, 2010

(54) INFORMATION RECORDING MEDIUM AND REGION MANAGEMENT METHOD FOR A PLURALITY OF RECORDING REGIONS EACH MANAGED BY INDEPENDENT FILE SYSTEM

(75) Inventors: Shinji Inoue, Osaka (JP); Takuji Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 132 days.

(21) Appl. No.: 10/546,453

(22) PCT Filed: Feb. 19, 2004

(86) PCT No.: PCT/JP2004/001865

§ 371 (c)(1),
(2), (4) Date: Nov. 17, 2005

(87) PCT Pub. No.: WO2004/075063

PCT Pub. Date: Sep. 2, 2004

(65) Prior Publication Data

US 2006/0195672 A1    Aug. 31, 2006

(30) Foreign Application Priority Data

Feb. 20, 2003    (JP) ............................. 2003-042859

(51) Int. Cl.
*G06F 13/00*    (2006.01)
(52) U.S. Cl. .................... 711/170; 711/111; 711/156; 711/171; 711/172; 711/173
(58) Field of Classification Search .................. 713/1, 713/2, 100; 711/170, 171, 172, 173, 111, 711/156
See application file for complete search history.

(56) References Cited

U.S. PATENT DOCUMENTS 5,461,719 A    10/1995    Hosoya
6,205,527 B1    3/2001    Goshey et al.

(Continued)

FOREIGN PATENT DOCUMENTS

EP    0524809    1/1993

(Continued)

OTHER PUBLICATIONS

PartitionMagic, User Guide, 1997, PowerQuest Corp. pp. 11-21, 26-30, 38-44, 62-80, 90, 117-133.*

(Continued)

*Primary Examiner*—Hong Kim
(74) *Attorney, Agent, or Firm*—Greenblum & Bernstein PLC

(57) ABSTRACT

A region management method for an information recording medium capable of maintaining data interchangeability among devices and preventing malfunction when one information recording medium shared among devices different in type or number of file systems that can be interpreted by devices is provided. A recording region of the information recording medium is divided into a plurality of regions, and region information such as position and size of each region is held in the information recording medium. Different file systems are constructed in individual data recording regions. In response to a command from an information processing apparatus, accessible regions by the information processing apparatus are changed over by, for example, referring to validity flag information that indicates a presently valid region.

22 Claims, 30 Drawing Sheets

U.S. PATENT DOCUMENTS

| | | |
|---|---|---|
| 6,289,426 B1 | 9/2001 | Maffezzoni et al. |
| 6,374,363 B1 | 4/2002 | Wu et al. |
| 6,374,366 B1 | 4/2002 | Maffezzoni |
| 6,385,707 B1 | 5/2002 | Maffezzoni |
| 6,430,663 B1 | 8/2002 | Ding |
| 6,477,629 B1 | 11/2002 | Goshey et al. |
| 6,963,981 B1 * | 11/2005 | Bailey et al. .................. 726/22 |
| 2002/0103996 A1 * | 8/2002 | LeVasseur et al. ............. 713/2 |
| 2005/0216684 A1 | 9/2005 | So et al. |

FOREIGN PATENT DOCUMENTS

| | | |
|---|---|---|
| EP | 1154350 | 11/2001 |
| JP | 5-027915 | 2/1993 |
| JP | 8-272541 | 10/1996 |
| JP | 2002-007139 | 1/2002 |
| JP | 2002-108568 | 4/2002 |
| JP | 2002-207626 | 7/2002 |

OTHER PUBLICATIONS

Thr Grub Manual, version 0.5.97, Oct. 22, 2000.*
PowerQuest, PartitionMagic, 1994-1997, Manual Version 8, pp. 155-181.*
English Language Abstract of JP 5-027915.
English Language Abstract of JP 8-272541.
English Language Abstract of JP 2002-108568.
English Language Abstract of JP 2002-207626.
English Language Abstract of JP 2002-007139.
U.S. Appl. No. 11/011,160 to So et al., filed Dec. 15, 2004.
U.S. Appl. No. 11/118,406 to So et al., filed May 2, 2004.
"Volume and File Structure of Disk Cartridge for Information Interchange," Standard ECMA-107, 2nd Edition, Jun. 1995.

* cited by examiner

Fig.4

112 REGION INFORMATION STORAGE SECTION

| REGION IDENTIFICATION NUMBER | START REGION ADDRESS | REGION SIZE | VALIDITY FLAG |
|---|---|---|---|
| 1 | 0 | 100MB | 1 (VALID) |
| 2 | 100MB | 30MB | 0 (INVALID) |
| 3 | 130MB | 100MB | 0 (INVALID) |
| : | : | : | : |
| N | 1000MB | 24MB | 0 (INVALID) |

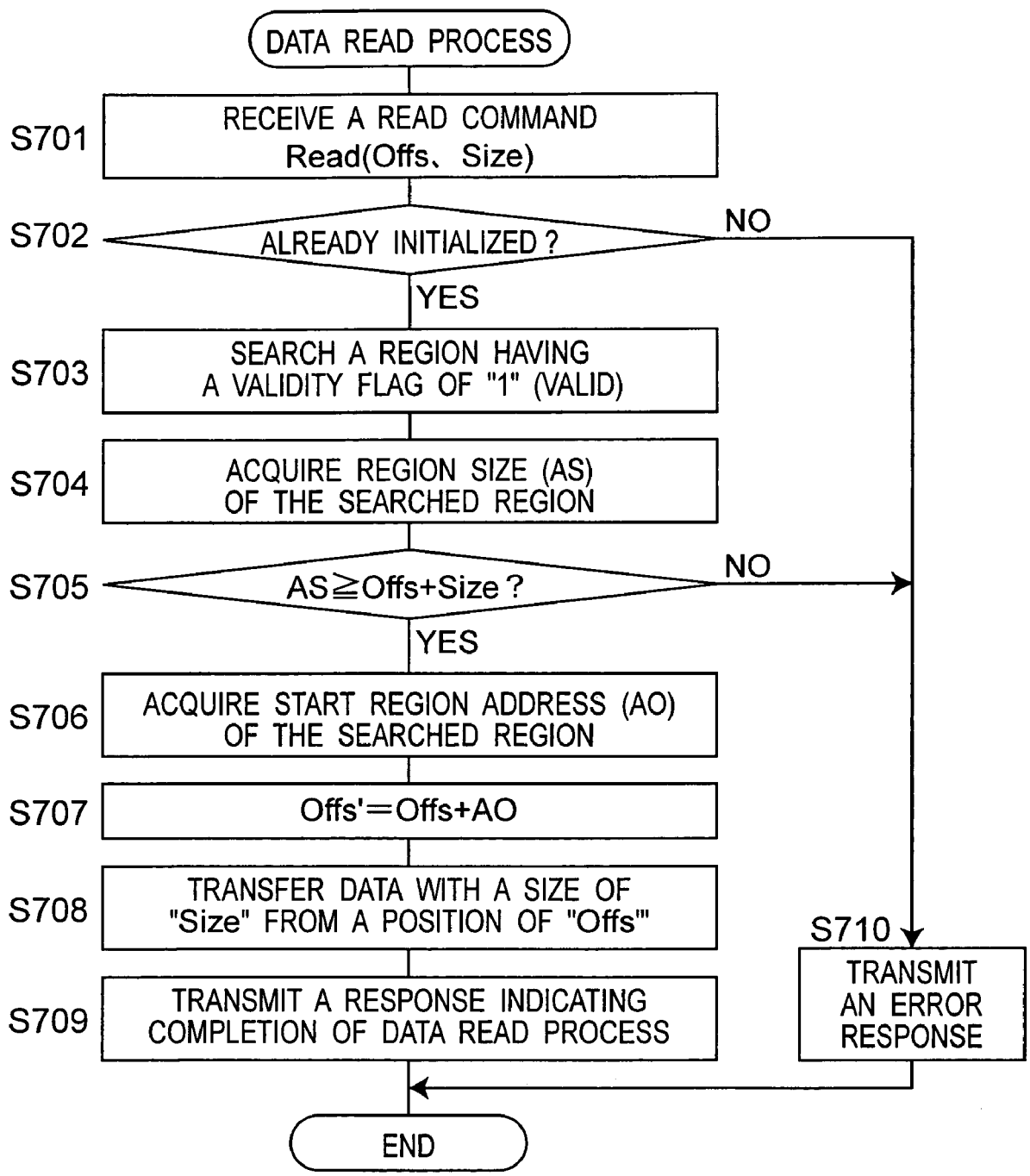

*Fig.10A*
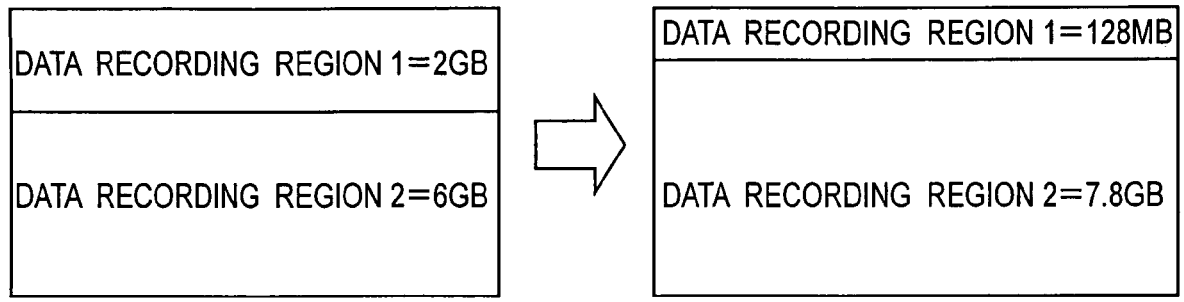
*Fig.10B*     *Fig.10C*     *Fig.10D*
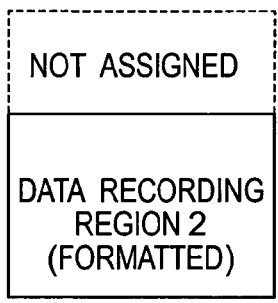   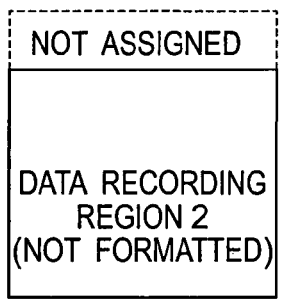   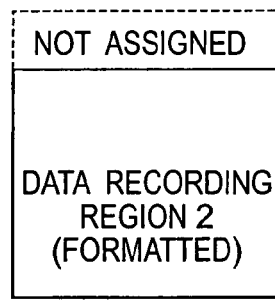
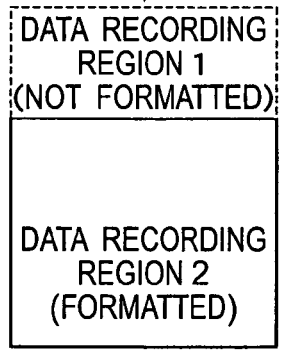   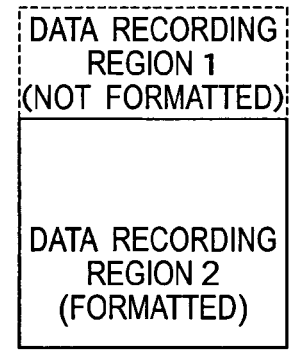
*Fig.10E*     *Fig.10F*

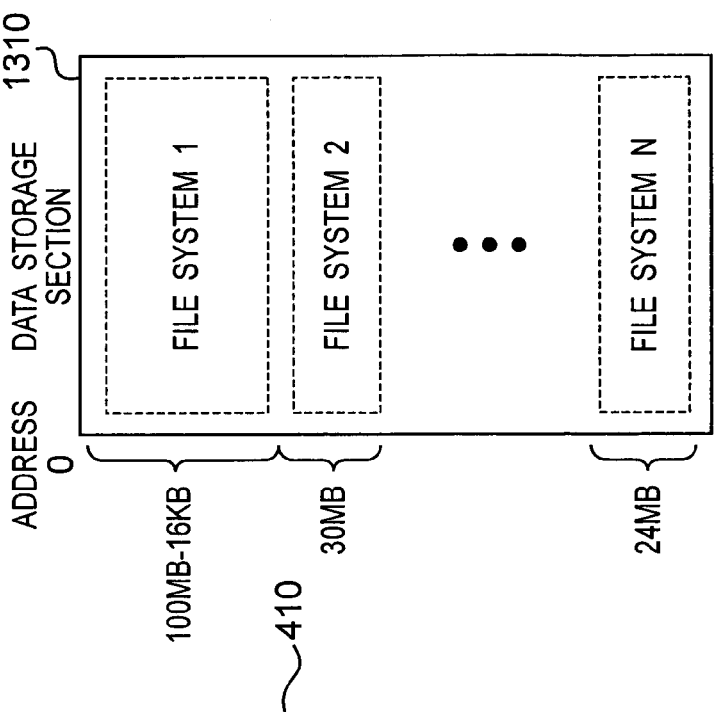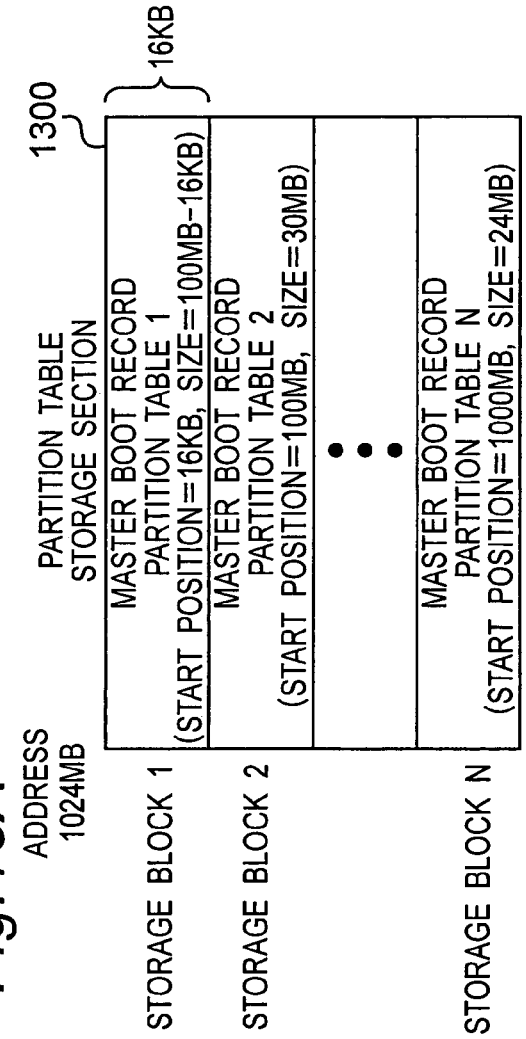

Fig.21A

112c REGION INFORMATION STORAGE SECTION

2001:
- START ADDRESS OF PARTITION TABLE STORAGE SECTION (USER DATA REGION)=1124MB
- BLOCK SIZE OF PARTITION TABLE STORAGE SECTION (USER DATA REGION)=16KB
- NUMBER OF BLOCKS OF PARTITION TABLE STORAGE SECTION (USER DATA REGION)=N
- START ADDRESS OF DATA STORAGE SECTION (USER DATA REGION)=0
- SIZE OF DATA STORAGE SECTION (USER DATA REGION)=1024MB

2002:
- START ADDRESS OF PARTITION TABLE STORAGE SECTION (PROTECT REGION)=1124MB+16KB×N
- BLOCK SIZE OF PARTITION TABLE STORAGE SECTION (PROTECT REGION)=16KB
- NUMBER OF BLOCKS OF PARTITION TABLE STORAGE SECTION (PROTECT REGION)=N
- START ADDRESS OF DATA STORAGE SECTION (PROTECT REGION)=1024MB
- SIZE OF DATA STORAGE SECTION (PROTECT REGION)=100MB

VALID BLOCK NUMBER=1

Fig.21B

1300b PARTITION TABLE STORAGE SECTION

- MASTER BOOT RECORD PARTITION TABLE 1 (USER DATA REGION)
- MASTER BOOT RECORD PARTITION TABLE 2 (USER DATA REGION)
- ...
- MASTER BOOT RECORD PARTITION TABLE N (USER DATA REGION)
- MASTER BOOT RECORD PARTITION TABLE 1 (PROTECT REGION)
- MASTER BOOT RECORD PARTITION TABLE 2 (PROTECT REGION)
- ...
- MASTER BOOT RECORD PARTITION TABLE N (PROTECT REGION)

INFORMATION RECORDING MEDIUM AND REGION MANAGEMENT METHOD FOR A PLURALITY OF RECORDING REGIONS EACH MANAGED BY INDEPENDENT FILE SYSTEM

TECHNICAL FIELD

The present invention relates to an information recording medium that manages data to be stored in various kinds of file systems, and a region management method t thereof.

BACKGROUND ART

Hitherto, management of data stored in data recording region of information recording media such as semiconductor memory, magnetic disk or magneto-optical disk has been realized by a file system. In the file system, the data recording region is divided into sectors which are minimum access units, or clusters each of which is a set of sectors, and one or more clusters are managed as a file.

As a file system used conventionally, FAT (File Allocation Table) file system is known (see Reference 1). The FAT file system is a general file system used in personal computers and other information appliances, and is characterized by unified management of physical storing position of data composing a file by a table called FAT. An information recording medium of which data is managed by a file system such as FAT file system can share files between different devices interpreting the same file system, so that data can be exchanged between devices.

However, aside from FAT file system, file systems include various types such as FAT32 file system, NTFS (NT file system), UDF (universal disk format), and file systems interpreted by devices are varied depending on devices. Hence, even if the same information recording medium is shared by a plurality of devices, when file systems used for storing data are different, data cannot be exchanged between devices.

To solve this problem, it has been proposed to provide the information recording medium with a region for storing plural kinds of file system management information, and a region for storing common file data (see Reference 2). In this conventional method, after the information recording medium is inserted into the device, the file system to be used is selected, and the beginning address of the region storing the corresponding file system management information is set as address 0, and it is attempted to access the file system management information. Thus, by selecting and using any one of the plural kinds of file system management information, data can be exchanged by using a common information recording medium on devices interpreting different file systems.

Reference 1: ISO/IEC9293, "Information Technology—Volume and file structure of disk cartridges for information," 1994

Reference 2: JP, 08-272541, A (Problems to be Solved by the Invention)

However, the prior art has the following problems. In the conventional region management method, plural kinds of file system management information are stored in individual file system types, and only one set of file data common to each file system is stored. Accordingly, when handling files having same data by different file systems, it is not needed to store a plurality of data entities, and data recording regions can be curtailed. In this method, however, upon editing one file, plural kinds of file management information must be changed at the same time, and files can be edited only by a device capable of interpreting all file system management information.

Between a plurality of devices recognizing different file systems, upon sharing information recording medium, if information recording medium formatted by a certain file system is used in a device capable of recognizing only other file system, original information in the information recording medium may be broken.

This problem occurs similarly, not only upon using the same information recording medium by different devices, but also upon using one information recording medium by the same device, as far as the device is capable of recognizing a plurality of file systems.

The invention is devised in the light of the above problem, and it is hence an object to present an information recording medium for maintaining data interchangeability or preventing malfunction, in the case different in the type or number of file systems capable of interpreting in each device, or in the case capable of recognizing a plurality of file systems in the same device, and its region management system.

(Method for Solving Problems)

A first region management method of the invention is a method of managing an information recording medium having a data recording region for storing data, the data stored in the recording medium being managed as a file by a file system. In the region management method, the data recording region is divided into a plurality of recording regions each managed by different file systems individually. A command is received from outside of the information recording medium. One of the divided recording regions is selected according to the received command, as a region accessible from outside of the information recording medium.

In the first region management method, a validity flag indicating a region which is valid presently among the plurality of divided recording regions may be set in the information recording medium. By referring to the validity flag prior to access to the data recording region in the information recording medium, the one of the divided recording regions to be accessible may be selected.

In the first region management method, the validity flag may be set to a specified value when initializing the information recording medium, and afterward the validity flag may be set again according to a command received from outside of the information recording medium.

In the first region management method, size of each divided recording region may be stored in the information recording medium, and the size of each divided recording region may be changed according to a command received from outside of the information recording medium.

In the first region management method, the information recording medium may be managed by file systems each constructed in each divided recording region and include a protect region and a user data region. The protect region may be accessible by a device connected to the information recording medium only when the device is authorized. The user data region may be accessible from the device independently of authorization.

A second region management method is a method of managing an information recording medium having a data recording region for storing data, the data stored in the recording medium being managed as a file by a file system. In the second region management method, the data recording region is divided into a plurality of recording regions each managed by different file systems individually. A plurality of storage blocks is stored in a consecutive recording region in the information recording medium. The storage block has constant data size, and stores a partition table. The partition table is provided to each divided recording region, and is information about a region management which is used by each file system of each divided region. A valid block number indicating a storage block which includes the partition table for a region in the divided recording regions that is accessible from outside of the recording medium is stored. According to a command received from outside of the recording medium, by referring to the validity block number, one storage block is selected from a partition table storage block, and a partition table is determined to be accessible from outside of the information recording medium.

In the second region management method, the partition table included in the selected storage block may be disposed at the beginning of a logical address space of the information recording medium.

In the second region management method, the partition table may include start address of the region managed by the file system and size of the region, and regions specified by the respective partition tables do not overlap each other.

The data recording region may be managed by file systems each constructed in each divided recording region, and include a protect region and a user data region. The protect region may be accessible by a device connected to the information recording medium only when the device is authorized. The user data region may be accessible from the device independently of authorization. The partition table information may be provided to the user data region and protect region. Regarding the same divided recording region, a partition table for the user data region and a partition table for the protect region may be managed in pairs.

A first information recording medium of the invention is a recording medium having a data recording region for storing data. The recording region is divided into a plurality of regions. A different file system for managing data stored in each region is constructed in each divided region. The information recording medium includes a region information storage section that stores a validity flag showing a region in the divided regions that is accessible from an external device, and an access region judging section that selects one valid region by referring to the validity flag and allows access to the selected region by the external device.

A second information recording medium of the invention is a recording medium having a data recording region for recording data. The data recording region is divided into a plurality of recording regions each managed by different file system. The information recording medium includes a partition table storage section that stores a plurality of storage blocks for storing a partition table which is information about region management used by the file system in each divided region, a command receiving section that receives a command from outside of the information recording medium, a region information storage section that stores valid block number indicating a storage block of the plurality of storage blocks in the partition table storage section, the storage block including the partition table which is accessible from an external device, and an access region judging section that selects one storage block from the partition table storage section with reference to the valid block number, and determines the partition table which is accessible from the external device, on the basis of a command received from outside of the information recording medium.

A third region management method of the invention is a method of managing an information recording medium having a data recording region for storing data, the data stored in the recording medium being managed as a file by a file system. The third region management method includes, storing a plurality of types of sizes of the data recording region accessible from outside of the information recording medium, and changing the size of accessible region according to a command receiving from outside of the information recording medium.

In the third region management method, valid region information may be stored. The valid region information is information indicating the size which is presently valid in a plurality of types of sizes of data recording regions accessible from outside of the information recording medium. Prior to access to the data recording region in the information recording medium, by referring to the valid region information, the size of accessible region may be recognized to judge possibility of access.

In the third region management method, the valid region information may be set to one of the plurality of sizes stored, simultaneously with initialization of the information recording medium, and it may be set again by a command received from outside of the information recording medium.

In the third region management method, the stored size of each region can be changed by a command received from outside of the information recording medium.

In the third region management method, the information recording medium may include a protect region and a user data region. The protect region may be accessible by a device connected to the information recording medium only when the device is authorized. The user data region may be accessible from the device independently of authorization.

A third information recording medium of the invention is an information recording medium having a data recording region for recording data. The recording medium includes a region information storage section and an access judging section. The region information storage section stores a plurality of types of sizes of the data recording region accessible from outside of the information recording medium, and valid region information which is information indicating the size which is presently valid in a plurality of types of sizes of data recording regions accessible from outside of the information recording medium. Prior to access to the data recording region in the information recording medium, the access judging section recognize the size of accessible region by referring to the valid region information, and judges possibility of access.

In the third information recording medium, a plurality of types of region sizes accessible from outside of information recording medium is stored in the information recording medium, and the size of region may be changed over by a command received from outside of the information recording medium. Thus, data interchangeability between devices can be maintained and malfunction can be prevented, even when the devices are different in type and number of file systems which the devices can interpret.

A fourth region management method of the invention is a method of managing an information recording medium having an data recording region for storing data, the data stored in the recording medium being managed as a file by a file system. The fourth region management method including, storing information providing size of data recording region to a specific register, setting the information providing size of data recording region in the register simultaneously with initialization of the information recording medium to a specific value smaller than the actual size of the data recording region, and setting again, according to a command received from outside of the information recording medium, the information providing size of data recording region in the register to an actual size of the information recording medium.

In the fourth region management method, when setting the size of the data recording region in the register at 0 kB, the information recording medium may prevent reception of a data read command or data write command from outside of the information recording medium.

In the fourth region management method, the information recording medium may include a protect region and a user data region. The protect region may be accessible by a device connected to the information recording medium only when the device is authorized. The user data region may be accessible from the device independently of authorization. At this time, the information providing size of data recording region in the register is set to provide the size of the user data region.

A fourth information recording medium of the invention is an information recording medium having a data recording region for recording data. The information recording medium includes a register that stores information providing size of data recording region to a specific register, a command receiver that receives a command from outside of the information recording medium, and an access region judging section that sets the information providing size of data recording region in the register simultaneously with initialization of the information recording medium to a specific value smaller than the actual size of the data recording region, and sets again, according to a command received from outside of the information recording medium, the information providing size of data recording region in the register to an actual size of the information recording medium.

In the fourth information recording medium, size information of the data recording region is stored in a specific register. Simultaneously with initialization of information recording medium, the size of the data recording region in the register is set to a specific value. Size of data recording region in the register is set again to actual size of the data recording region by a command received from outside of the information recording medium. Thus, data interchangeability between devices can be maintained and malfunction can be prevented, even when the devices are different in type and number of file systems which the devices can interpret.

(More Advantageous Effects than in the Prior Art)

According to the invention, the data recording region in the information recording medium is divided into a plurality of regions managed by different file systems, a plurality kinds of information of each region starting position and size are stored in the information recording medium, and by selecting one accessible region by command entering from outside of the information recording medium, a plurality of independent file systems can be constructed in one information recording medium, and if the type or number of file systems capable of interpreting differs in each device, data interchangeability between devices can be maintained, and malfunction can be prevented.

In the information recording medium, a plurality of storage block storing partition table information as information relating to region management used by file system are stored in the information recording medium, and by selecting one storage block by command entering from outside of the information recording medium, and disposing it at the beginning of data recording region, a plurality of independent file systems can be constructed in one information recording medium, and if the type or number of file systems capable of interpreting differs in each device, data interchangeability between devices can be maintained, and malfunction can be prevented.

BRIEF DESCRIPTION OF DRAWINGS

FIG. 4 is a diagram showing an example of region information storage section in Embodiment 1 of the invention.

FIG. 7 is a flowchart of data read process in Embodiment 1 of the invention.

FIGS. 10A to 10F are diagrams explaining the setting change process of region size of data recording region in Embodiment 1 of the invention.

FIGS. 15A to 15C show an example of region information storage section, an example of partition table storage section, and an example of data storage section, respectively.

FIG. 21A is a diagram showing an example of region information storage section having user data region and protect region in data recording region in Embodiment 2 of the invention.

FIG. 21B is a diagram showing an example of its partition table storage section.

BEST MODE FOR CARRYING OUT THE INVENTION

Region management method of information recording medium of the invention is described below while referring to the accompanying drawings. In the following explanation, as specific examples of carrying out the region management method of the invention, the information processing apparatus and information recording medium are shown.

EMBODIMENT 1

Figure 1:
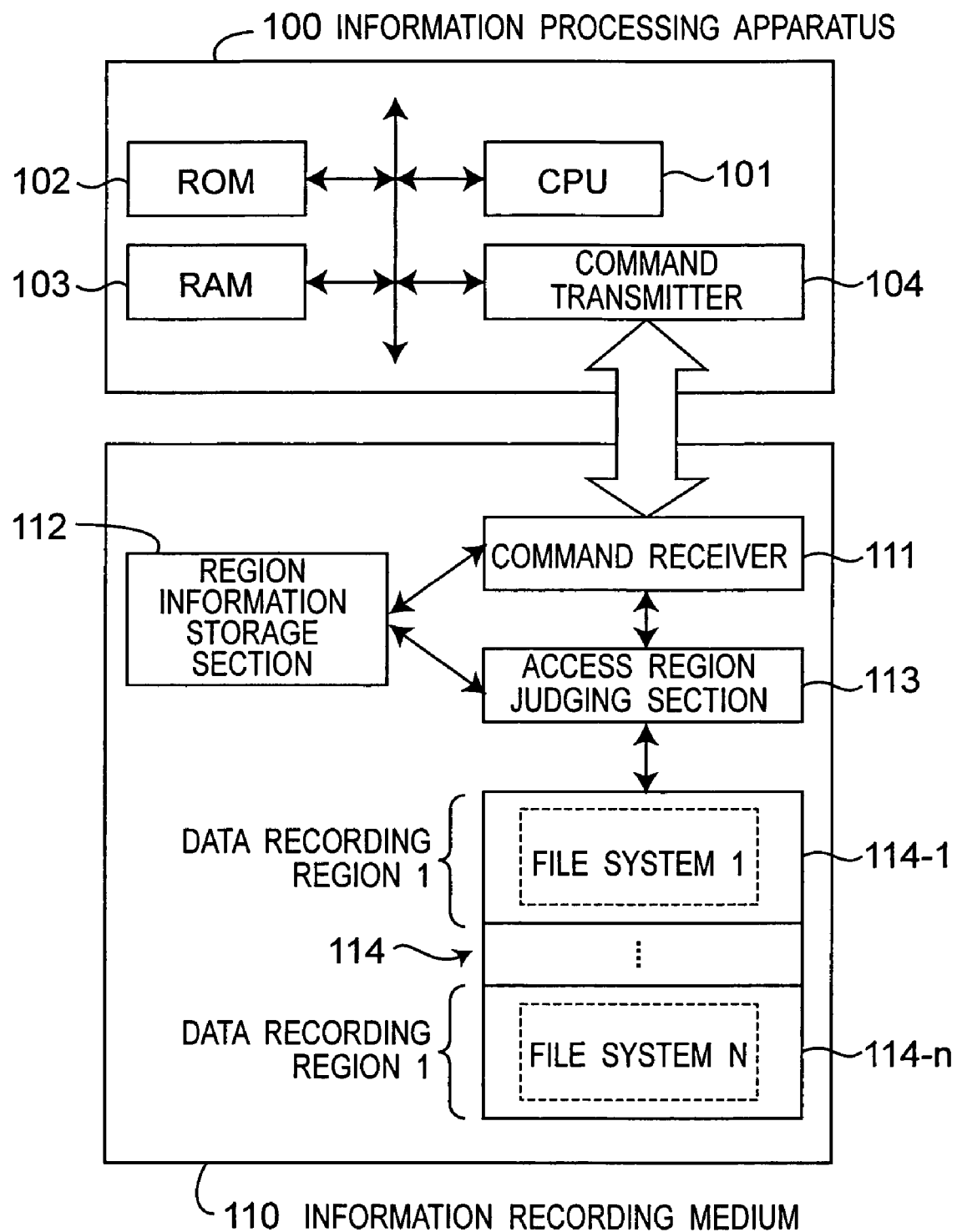
FIG. 1 is a block diagram of an information processing system including an information processing apparatus and an information recording medium in Embodiment 1 of the invention.

FIG. 1 is a block diagram of information processing system including information processing apparatus and information recording medium in embodiment 1 of the invention. In FIG. 1, an information processing apparatus 100 includes a CPU 101, a ROM 102 storing programs or the like for operating on the information processing apparatus, a RAM 103 used in work memory or the like for holding data temporarily, and a command transmitter 104 for transmitting various commands to an information recording medium 110, and transmitting and receiving data.

The information recording medium 110 is composed of a command receiver 111 for receiving commands transmitted from the information processing apparatus 100, and transmitting and receiving data, a data recording section 114 for storing data as file under the control of file system, a region information storage section 112 for storing information about the data recording section 114 such as start position and size of a region, and an access region judging section 113 for determining the access region on the data recording section 114 on the basis of the information stored in the region information storage section 112 with respect to access request from the command receiver 111. The access region judging section 113 executes various processes about operation of the information recording medium 110 aside from the region determining process.

Data recording region in the data recording section 114 is divided into a plurality of regions 114-1, . . . , 114-n, and a file system corresponding to each data recording region is constructed in these regions 114-1, . . . , 114-n. In this embodiment, FAT file system is used as a file system.

(FAT File System)

Figure 2:
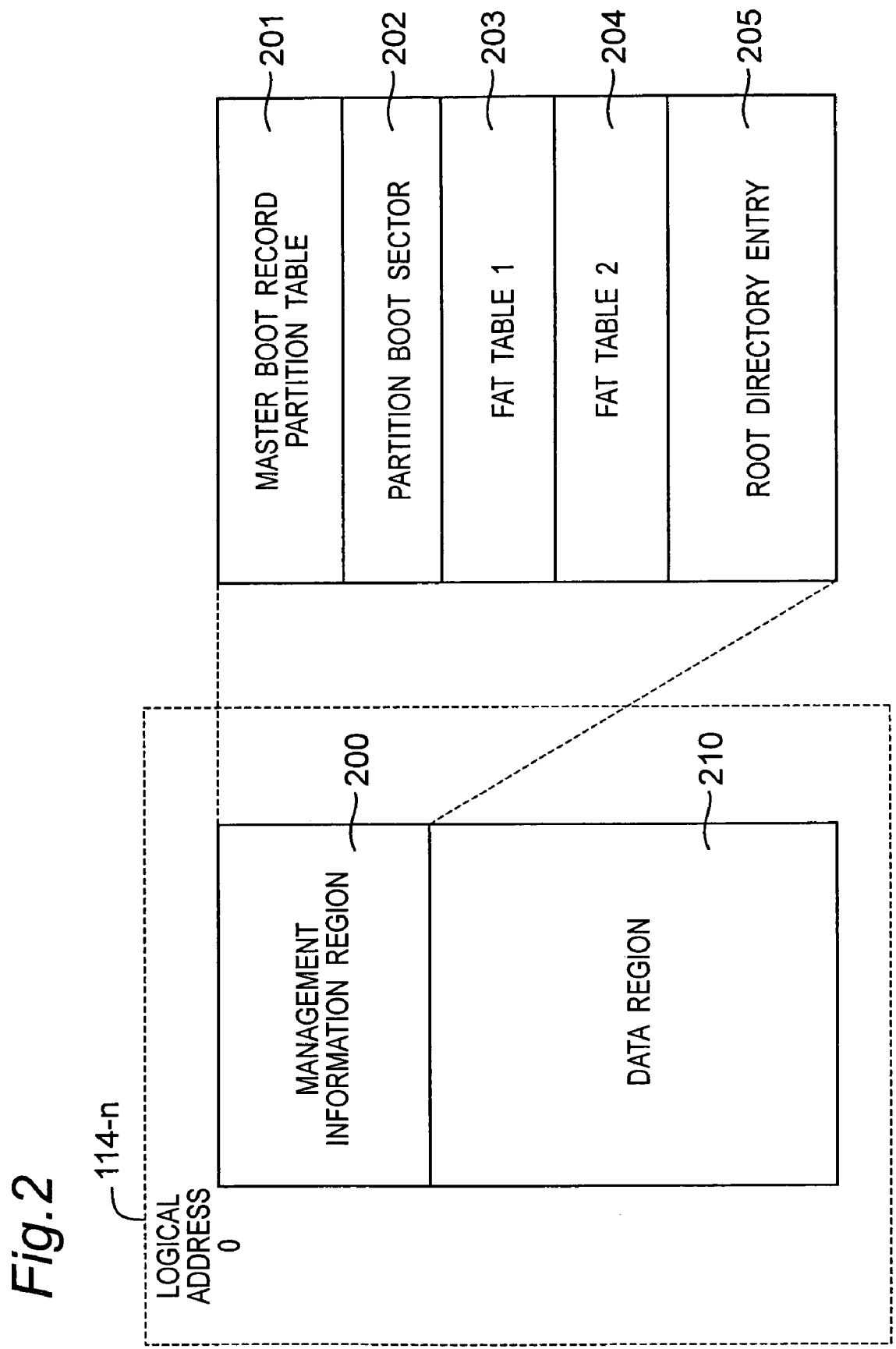
FIG. 2 is a diagram of FAT file system.

FIG. 2 shows the FAT file system stored in one of the divided data recording regions. One data recording region 114-n has a management information region 200 for managing the data recording region at its beginning, followed by a data region 210 for storing data in the file.

The management information region 200 is composed of a master boot record partition table 201 for storing information for managing a plurality of regions called partitions into which one data recording region 114-n is divided, a partition boot sector 202 for storing management information in one partition, FAT tables 203, 204 showing physical storage positions of data included in the file, and a root directory entry 205 for storing information of file and directory existing immediately beneath the root directory. Since the FAT table is an important region showing the physical storage position of data included in the file, usually, two FAT tables 203, 204 having identical information are used and duplexed in the information recording medium.

The data region 210 is divided into a plurality of clusters and managed, and data included in the file is stored in each cluster. A file storing much data uses a plurality of clusters as data storage region and linkage of clusters is managed by the link information stored in the FAT tables 203, 204.

Figure 3A:
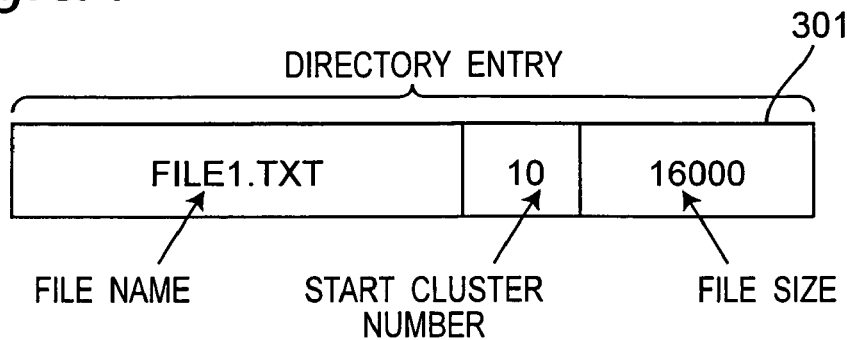
FIGS. 3A to 3C show data storage examples of FAT file system.
Figure 3B:
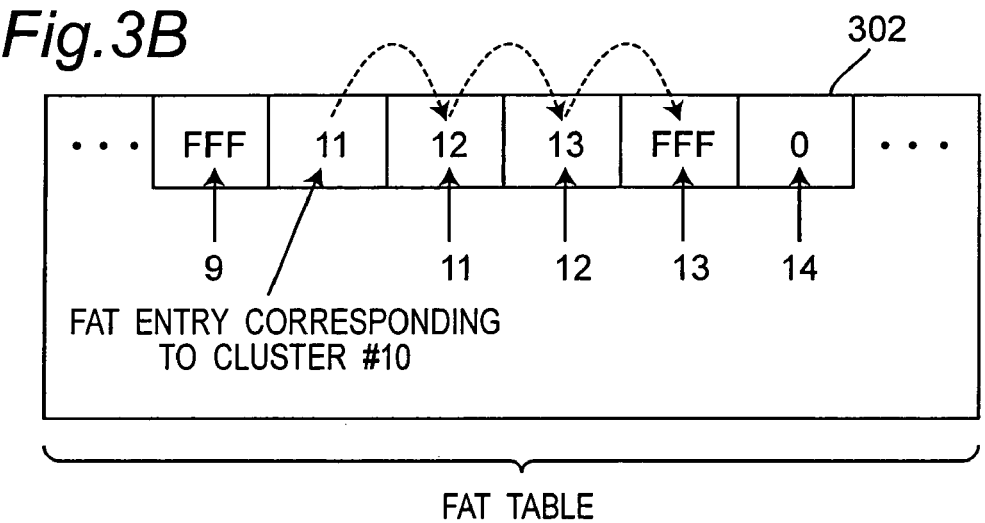
Figure 3C:
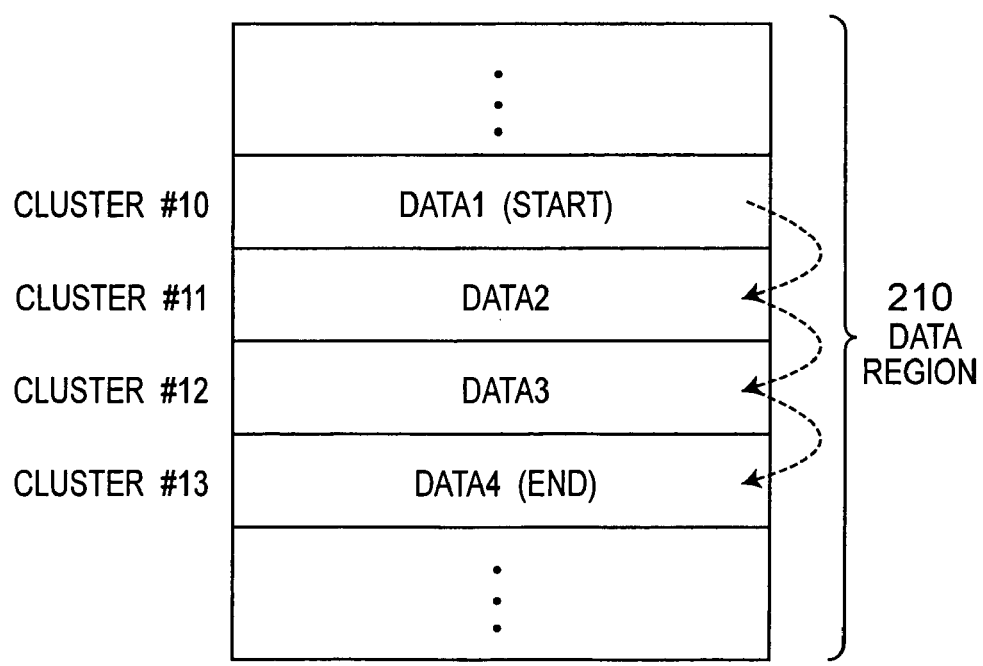

Referring now to FIG. 3A to FIG. 3C, examples of read operations for file data in the FAT file system are explained.

In part of the root directory 205 or data region 210, directory entry 301 storing file name and file size is stored as shown in FIG. 3A. The data region 210 which is storage destination of file data is managed in the cluster unit, and each cluster is identified with a unique cluster number. To specify the cluster in which file data is stored, the directory entry 301 stores the cluster number (start cluster number) of the cluster storing the beginning portion of the file data. The example of directory entry 301 in FIG. 3A shows that for file having the name of FILE1.TXT, data is stored from the cluster with cluster number 10.

In the case of a file having data stored in a plurality of clusters, cluster numbers following the start cluster number must be specified to trace clusters storing the data. Link information necessary for tracing clusters is stored in the FAT table. FIG. 3B shows an example of FAT table 302. The FAT table 302 has fields corresponding to cluster numbers, and each field stores FAT entry showing link information of each cluster is stored in each field. The FAT entry stores the cluster number of the cluster to be linked next. In the example in FIG. 3B, since "11" is stored as FAT entry corresponding to cluster number 10, the cluster of cluster number 10 is linked to the cluster of cluster number 11. Similarly, the FAT entry corresponding to cluster number 11 stores "12", and the FAT entry corresponding to cluster number 12 stores "13", and cluster numbers 10, 11, 12, 13 are linked sequentially. Next, the FAT entry corresponding to cluster number 13 stores FFF, and FFF means the terminal end of link, and hence the link beginning with cluster number 10 ends with four clusters 10, 11, 12, 13. On the other hand, "0" stored in the FAT entry corresponding to cluster number 14 means a vacant region in which the cluster is not assigned the file.

From FIG. 3A and FIG. 3B, data regions assigned in file "FILE1.TXT" are recognized to be cluster numbers 10, 11, 12, 13, and when actually reading in the file data of FILE1.TXT, as shown in FIG. 3C, data in cluster numbers 10, 11, 12, 13 of data region 303 is read in sequentially.

(Region Management Operation)

The region management method of the information recording medium having such configuration is explained below.

In this embodiment, the recording region of data recording section 114 in the information recording medium 110 is divided and managed in a plurality of regions managed independently by different file systems. By a command entered from the information processing apparatus 100, a region accessible from the information processing apparatus 100 is changed over. Hence, a plurality of file systems coexist in the information recording medium 110, and a common information recording medium can be shared among devices different in file systems that can be interpreted by devices.

FIG. 4 is a diagram showing an example of the region information storage section 112 in the embodiment.

The region information storage section 112 stores a region identification number 401 which is a unique number for identifying the region, a start region address 402 showing start address of the region, a region size 403 showing size of the region, and a validity flag 404 showing a region which is presently valid. The address stored in the region information storage section 112 is a physical address.

Sets of these four types of information 401 to 404 correspond to the divided regions 114-1 to 114-n of the data recording section 114, and are present as many as the number of divided region of the data recording section 114. In the example in FIG. 4, the data recording section 114 is divided into N regions, and the first region is a region of size of 100 MB from the beginning address of the data recording section 114. Similarly, the second region is a region of size of 30 MB started from the position deviated by 100 MB from the beginning of the data recording section 114, the third region is a region of size of 100 MB started from the position deviated by 130 MB from the beginning of the data recording section 114, and the N-th region is a region of size of 24 MB started from the position deviated by 1000 MB from the beginning of the data recording section 114.

The validity flag 404 shows which region is accessible at the present out of the first to N-th regions, and the example in FIG. 4 shows that the first region is presently accessible.

(Initialization Process)

Figure 5A:
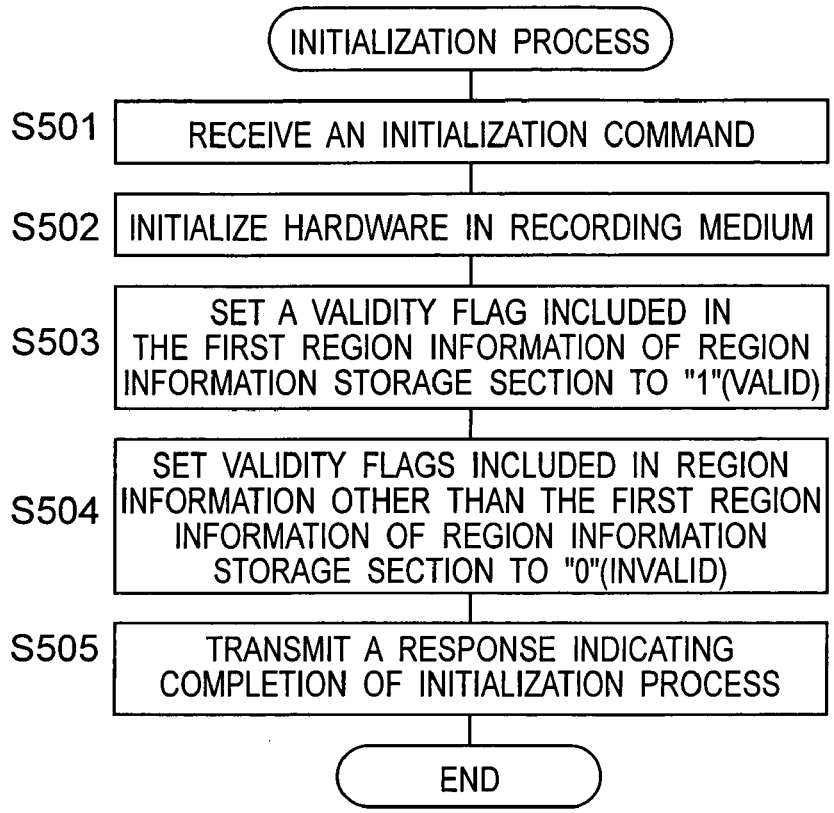
FIG. 5A is a flowchart of initialization process in Embodiment 1 of the invention.

Initialization process of the information recording medium 110 in the embodiment is explained. When information recording medium 110 is connected to the information processing apparatus 100, the information processing apparatus sends an initialization command to the information recording medium, and initializes the information recording medium. FIG. 5A is a flowchart showing the flow of initialization process in the information recording medium 110.

In the initialization process, first, the command receiver 111 of the information recording medium 110 receives an initialization command from the information processing apparatus 100 (S501).

Next, the data recording section 114, other processing parts and register in the information recording medium 110 are initialized, and the information recording medium 110 is made ready to be accessed from outside (S502).

Of the information of a plurality of regions included in region information storage section 112, the validity flag included in the first region information is set to 1 (valid) (S503).

All validity flags included in other region information than the first region information are set to 0 (invalid) (S504).

Finally, completion of initialization process is noticed to the information processing apparatus by way of the command receiver of the information recording medium (S505).

Figure 5B:
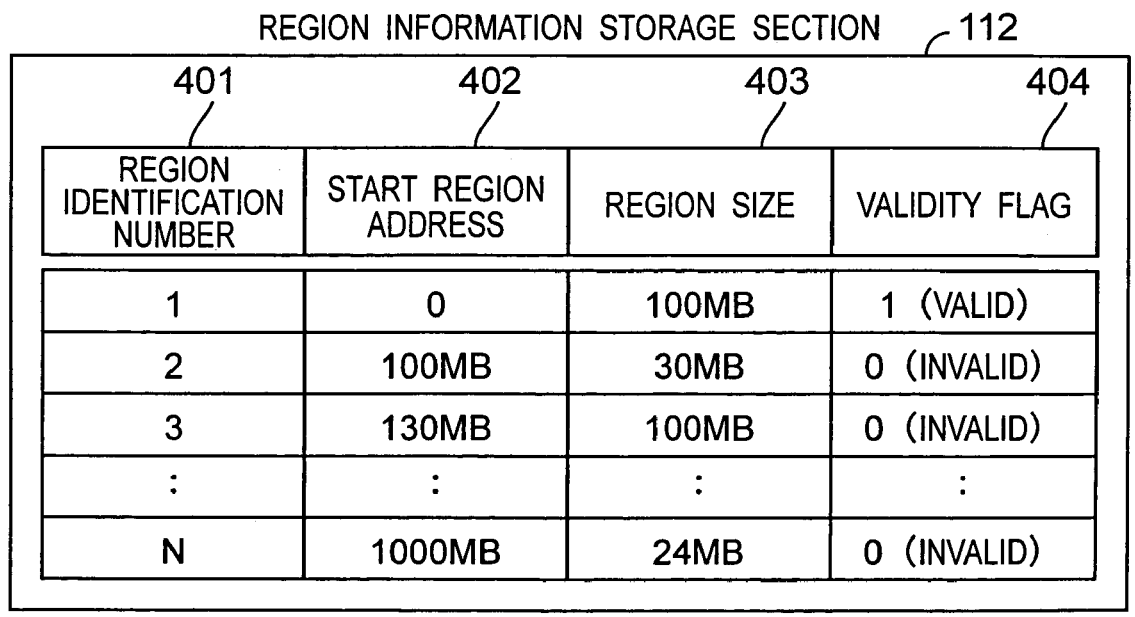
FIG. 5B is a diagram showing an example of region information storage section in Embodiment 1 of the invention (state after initialization).

Upon completion of initialization process, in the region information storage section 112 in the information recording medium 110, a validity flag is set only for the first region as shown in FIG. 5B. In this state, the information processing apparatus can access the first region only.

(Region Changeover Process)

Region changeover process in the embodiment is described. Region changeover process is a process of changing over valid regions. This process is executed by transmitting a region changeover command in which the region identification number of the region desired to be valid is specified, and from the information processing apparatus to the information recording medium.

Figure 6A:
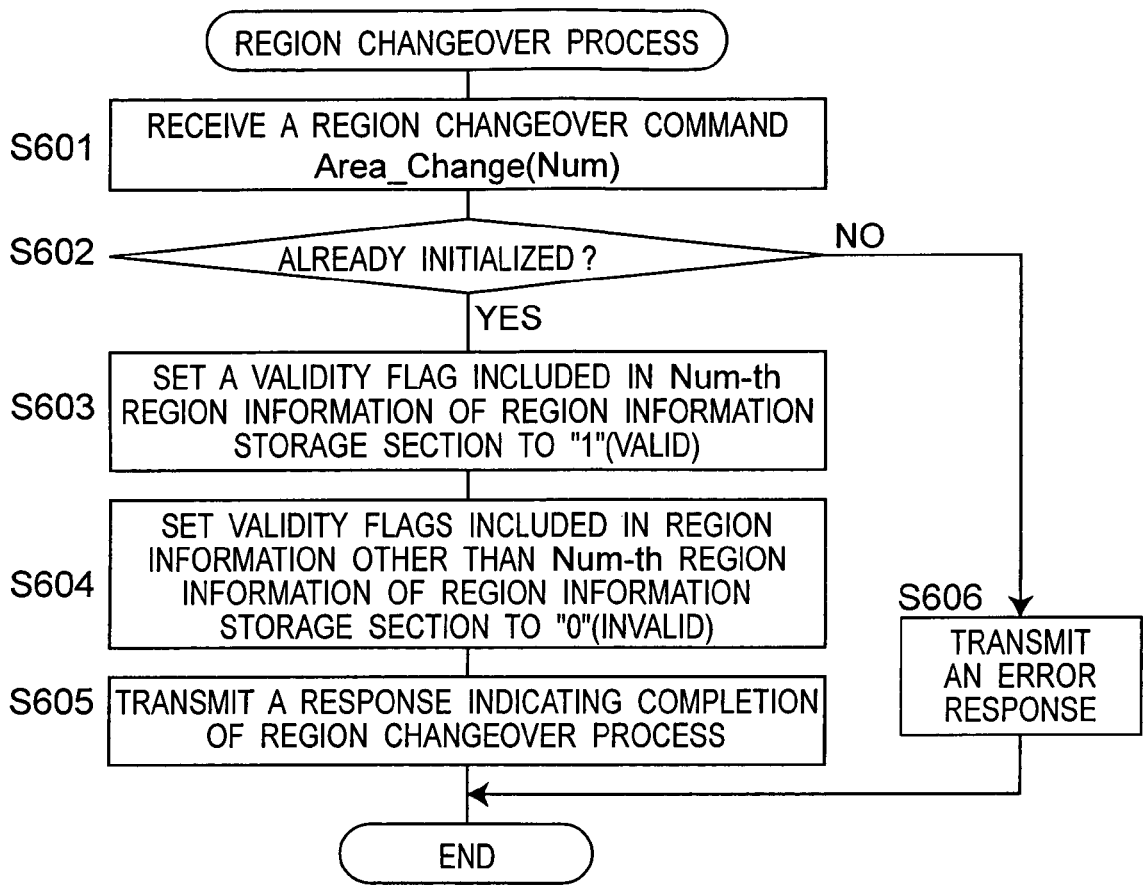
FIG. 6A is a flowchart of region changeover process in Embodiment 1 of the invention.

FIG. 6A is a flowchart showing flow of region changeover process in the information recording medium.

In region changeover process, first, the command receiver 111 of the information recording medium 110 receives a region changeover command from the information processing apparatus 100 (S601). The region changeover command is expressed, for example, as Area_Change (Num), and the region identification number is set by argument Num, and thus the region identification number of the region desired to be changed over is specified.

Next, it is judged whether the information recording medium 110 has been already initialized or not (S602). If not initialized, an error response is sent to the information processing apparatus 100 by way of the command receiver 111 of the information recording medium 110, and the process is terminated (S606).

If already initialized, by referring to the region identification number specified by the region changeover command, the validity flag of the corresponding region in the region information storage section 112 is set to 1 (valid) (S603).

All validity flags included in other region information than the region of which validity flag is set in S603 are set to 0 (invalid) (S604).

Finally, completion of region changeover process is noticed to the information processing apparatus 100 by way of the command receiver 111 of the information recording medium 110 (S605).

Figure 6B:
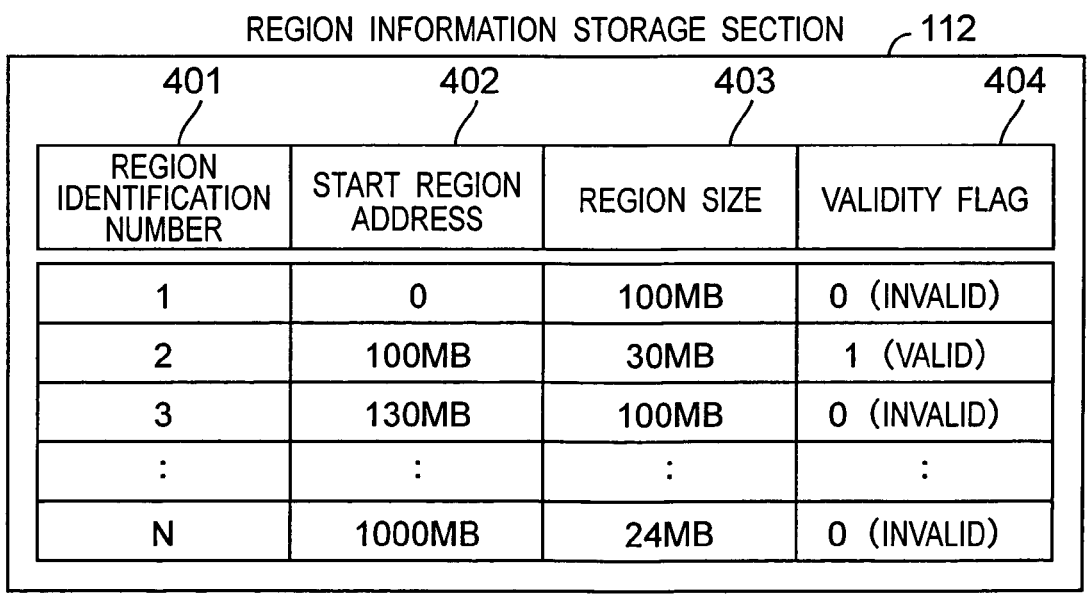
FIG. 6B is a diagram showing an example of region information storage section in Embodiment 1 of the invention (state after region changeover process).

FIG. 6B shows an example of region information storage section 112 in the information recording medium 110 after the region changeover process. The diagram shows an example of specifying "2" in the argument Num for indicating the region identification number of changeover destination. The validity flag is set valid "1" only in the second region, and the information processing apparatus 100 can access only the second region.

(Data Access Process)

Access procedure to the information recording medium 110 in the embodiment is explained as an example of data read process.

Data reading/writing from the information recording medium 110 is executed by transmitting data read/writ command to the information recording medium 110. FIG. 7 is a flowchart of flow of data read process in information recording medium 110.

In the data read process, first, the command receiver 111 of information recording medium 110 receives a data read command from the information processing apparatus 100 (S701). The data read command is expressed, for example, as Read (Offs, Size). The first argument (Offs) specifies read start address, and the second argument (Size) specifies read size. The argument Offs is address in a logical address space of the information recording medium 110 as seen from the information processing apparatus (that is, offset value from the beginning of the logical address space).

It is then judged if the information recording medium 110 has been already initialized or not (S702). If not initialized, an error response is sent to the information processing apparatus 100 by way of the command receiver 111 of the information recording medium 110, and the process is terminated.

If already initialized, a region of validity flag "1" (valid) is searched in the region information in region information storage section 112 (S703).

On the basis of the searched region, the region size AS of the region is acquired (S704).

The sum of the value of argument Size and the value of argument Offs is compared with region size AS. Using the comparison result, it is confirmed whether or not all read region is included in the accessible region (S705). If the region size AS is smaller, it is judged that the read region exceeds the accessible region, and an error response is sent to the information processing apparatus 100 by way of the command receiver 111 of the information recording medium 110 (S710), and the process is terminated.

When the region size AS is not less than the sum of the value of argument Size and the value of argument Offs, the start address AO of the searched region is acquired from the start region address of the region information storage section 112 (S706).

Physical address Offs' of read start position of the data recording section 114 is determined (S707). Read start position Offs' is calculated by adding start address AO to argument Offs.

From the position of read start position Offs', data with size equal to a value of argument Size is read, and the data is sent to the information processing apparatus 100 by way of the command receiver 111 of the information recording medium 110 (S708).

Finally, completion of data read process is noticed to the information processing apparatus 100 by way of the command receiver 111 of the information recording medium 110 (S709).

In this manner, by managing the information of the presently valid region in the information recording medium 110, and converting the access position specified by the information processing apparatus 100 into a physical address of the presently valid region, access is permitted to a specific region in the recording region among a plurality of the divided data recording regions 114.

Write process can be executed same as read process by specifying write address and data to be written.

(Region Size Changing Process)

Explanation is made to procedure of changing (setting) the region size of each one of the a plurality of divided regions in the embodiment.

Figure 8:
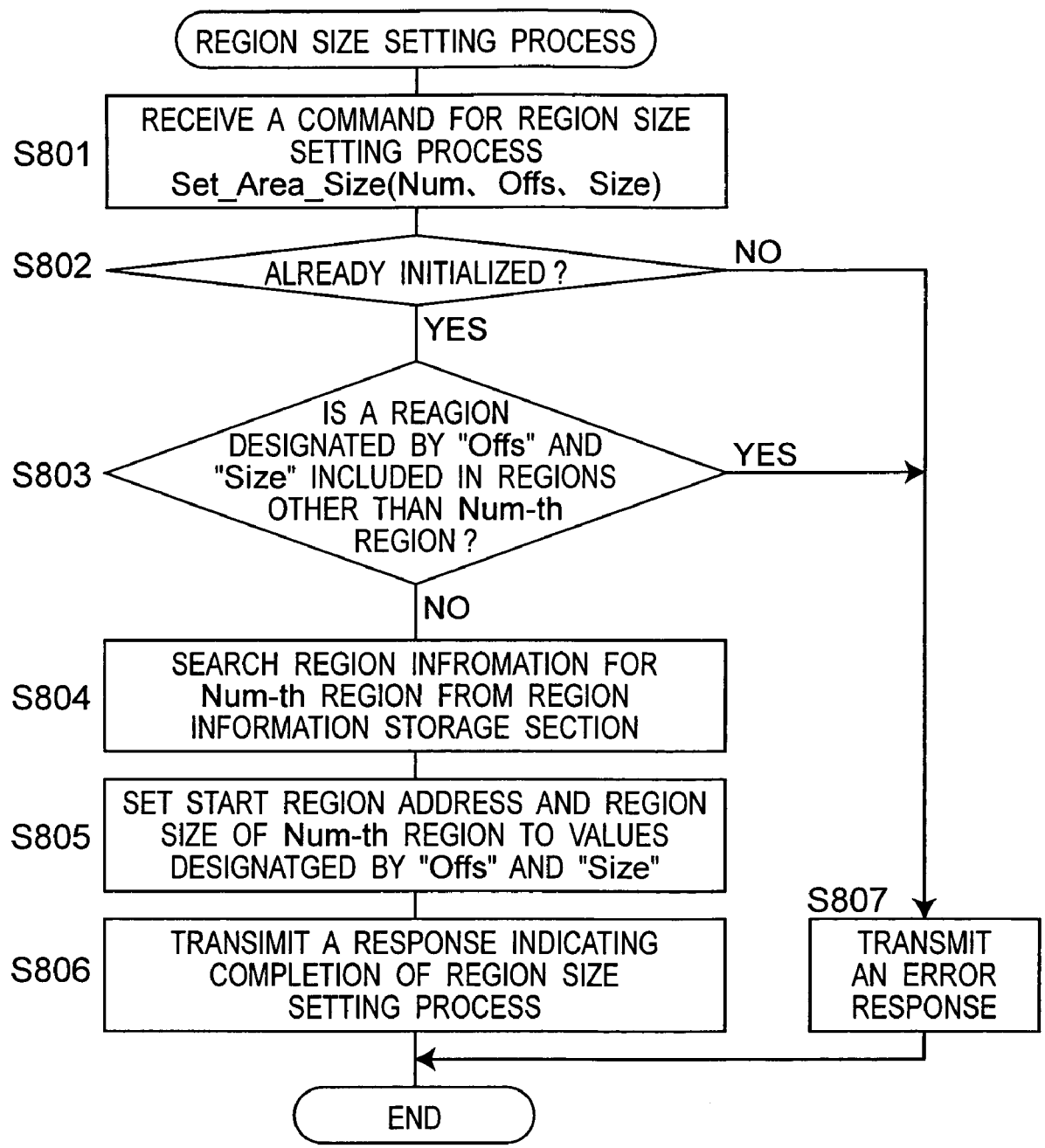
FIG. 8 is a flowchart of region size setting process in Embodiment 1 of the invention.

Region size changing process is executed by transmitting a region size setting command, in which region identification number of a region desired to be set, region start position, and size are specified, from the information processing apparatus 100 to the information recording medium 110. FIG. 8 shows the flow of region size setting process in the information recording medium 110.

In the region size changing process, first, the command receiver 111 of the information recording medium 110 receives a region size setting command from the information processing apparatus 100 (S801). The region size setting command is expressed, for example, as Set_Area_Size (Num, Offs, Size), in which the first argument Num specifies a region identification number of a region of which size is desired to be set, the second argument Offs specifies a region starting address, and the third argument Size specifies a region size.

It is then judged if the information recording medium has been already initialized or not (S802). If not initialized, an error response is sent to the information processing apparatus 100 by way of the command receiver 111 of the information recording medium 110, and the process is terminated (S807).

If already initialized, it is judged if the region specified by arguments Offs and Size is included or not in the region other than the Num-th region (S803). If the region is included, the Num-th region after setting region size overlaps with other region, and an error response is sent to the information processing apparatus 100 by way of the command receiver of the information recording medium, and the process is terminated (S807).

If the region is not included, the region information about the Num-th region is searched from the region information storage section 112 (S804).

In the region information storage section 112, the start region address and region size of the region information about the searched Num-th region are changed to the values of arguments Offs and Size (S805).

Finally, completion of region size setting process is noticed to the information processing apparatus 100 by way of the command receiver 111 of the information recording medium 110 (S806).

In the region size setting process, if the region after setting does not overlap with other region, the region size can be set in the above procedure. When combining two regions into one region, the region after setting overlaps with other region. Hence, in this case, the region size must be set after once deleting the two regions. Such region deletion process is explained below.

(Region Deletion Process)

Figure 9:
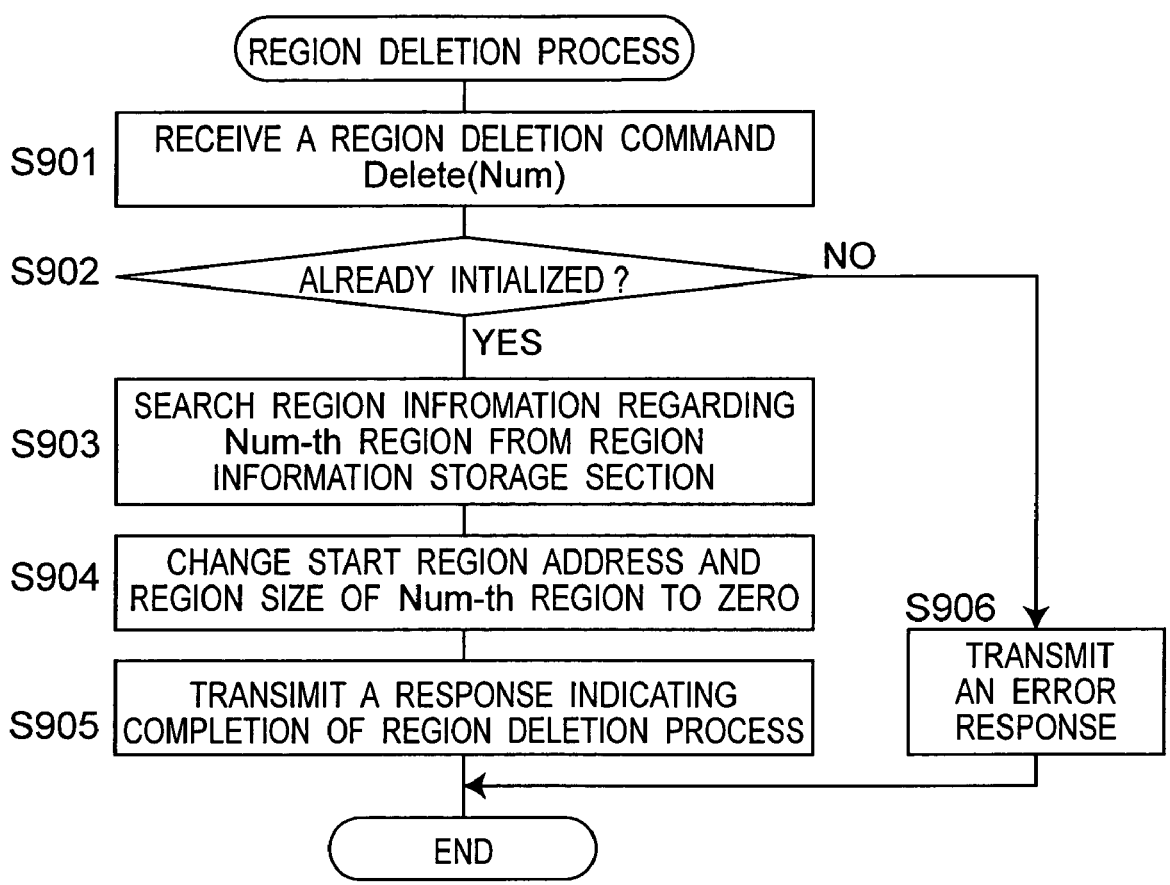
FIG. 9 is a flowchart of region deleting process in Embodiment 1 of the invention.

FIG. 9 is a flowchart of region deletion process in the information recording medium 111.

In the region deletion process, first, the command receiver 111 of the information recording medium 110 receives a region deletion command from the information processing apparatus 100 (S901). The region deletion command is expressed as Delete (Num), in which the argument Num specifies a region identification number of a region to be deleted.

It is then judged if the information recording medium 110 has been already initialized or not (S902). If not initialized, an error response is sent to the information processing apparatus 100 by way of the command receiver 111 of the information recording medium 110, and the process is terminated (S906).

If already initialized, region information about the Num-th region is searched from the region information storage section 112 (S903).

The start region address and region size of the region information about the searched Num-th region are both changed to 0 (S904).

Finally, completion of region deletion process is noticed to the information processing apparatus 100 by way of the command receiver 111 of the information recording medium 110 (S905).

By this processing, in this embodiment, it is possible to change over to a desired region by issuing a region changeover command before accessing the data in the information recording medium 110. Accordingly, when the recording region of the information recording section in the information recording medium 110 is divided into a plurality of regions, and in each divided region different file system is constructed, an information processing apparatus is possible to select and access a region in which a file system that can be interpreted by the information processing apparatus is constructed.

Specific examples of region size changing process and region deletion process are explained below by referring to FIG. 10A to FIG. 10F and FIG. 11.

As shown in FIG. 10A, when the data recording section 114 is divided into a data recording region 1 with 2 GB and a data recording region 2 with 6 GB, a process of changing these region sizes to 128 MB and 7.8 GB is explained.

Figure 11:
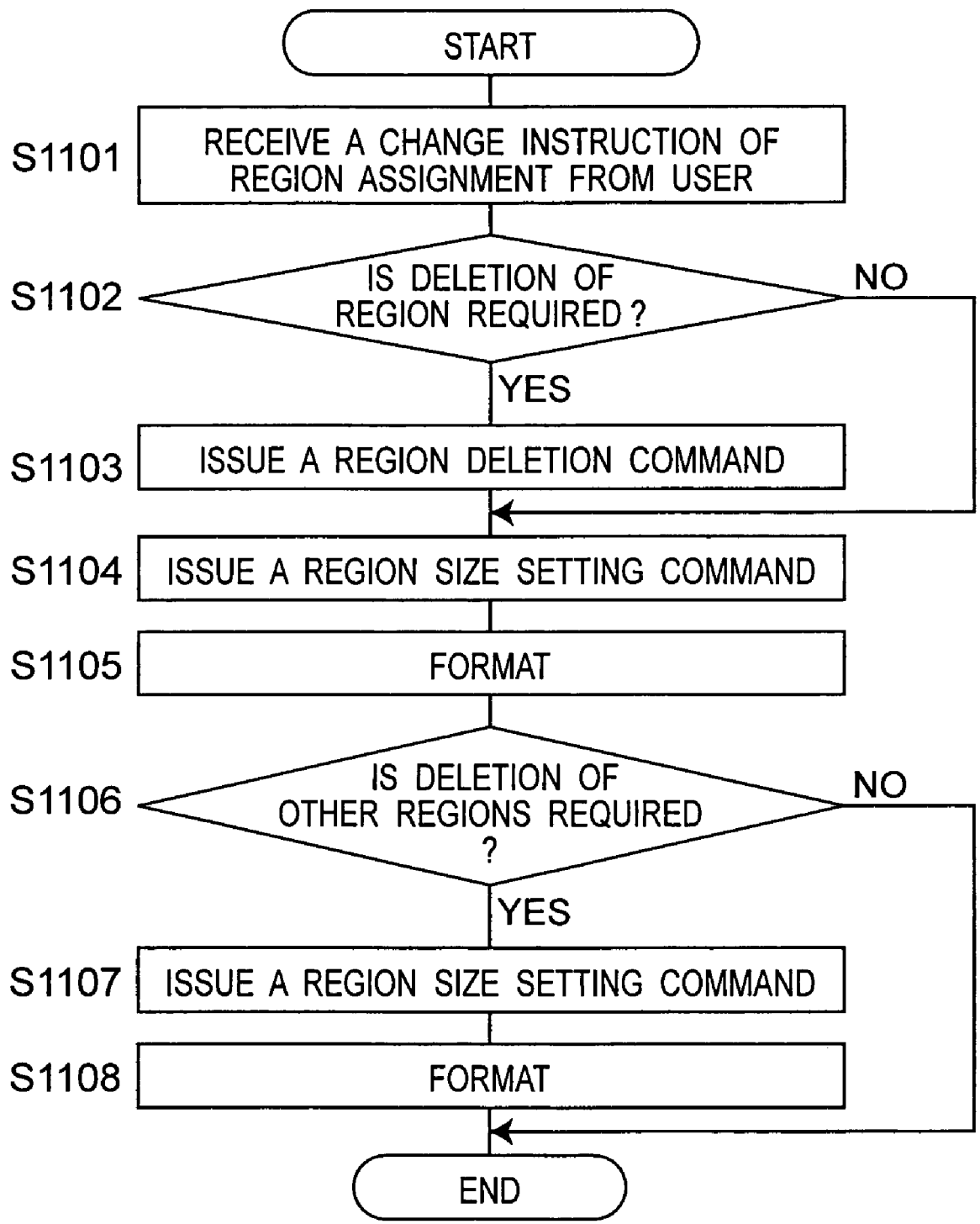
FIG. 11 is a flowchart of region assignment changing process in Embodiment 1 of the invention.

In FIG. 11, the command receiver 111 of the information recording medium 110 receives a change instruction of region assignment from the user (S1101). In the assignment change, it is judged whether deletion of region is required or not (S1102). If deletion is judged to be necessary, a region deletion command is issued (S1103), and the region is deleted. In the example shown in FIG. 10A, in order to expand the data recording region 2, the data recording region 1 must be deleted, and the data recording region 1 is deleted (see FIG. 10B). Next, issuing a region size setting command (S1104), the region size is changed. In the example in FIG. 10A to FIG. 10F, the data recording region 2 is expanded to 7.8 GB (see FIG. 10C). Next is the formatting process (S1105) (see FIG. 10D). It is then judged if necessary to set the region size of the other region or not (S1106). If necessary, issuing a region size setting command (S1107), this region is formatted (S1108). That is, after formatting of the data recording region 2, as shown in FIG. 10E, the region size of the data recording region 1 is set at 128 MB, and then the data recording region 1 is formatted as shown in FIG. 10F.

(Protect Region)

Explanation is made to a composition of information recording medium for reinforcing copyright protection of digital contents of music data or the like, while corresponding to a plurality of file systems.

Figures 12A, 12B:
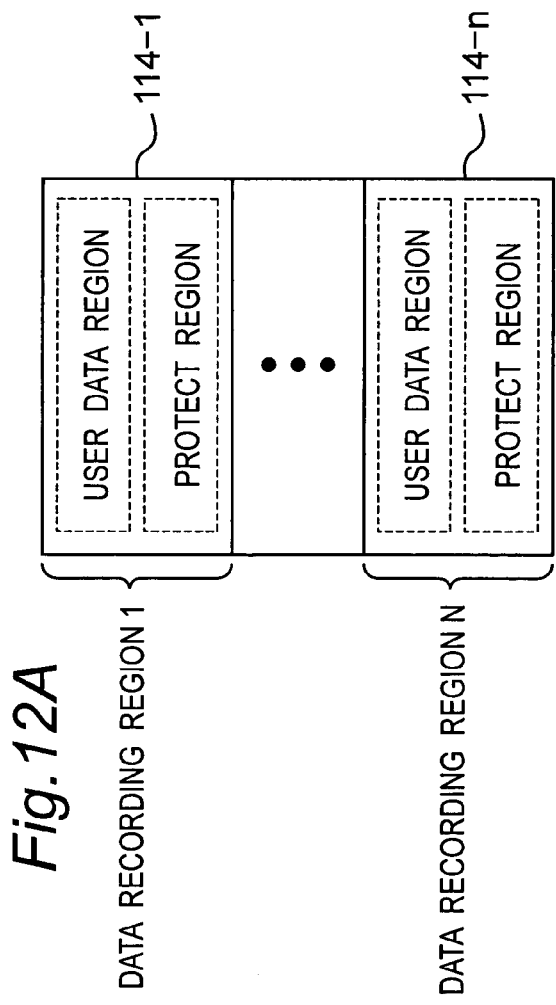
FIG. 12A is a diagram showing an example of data recording region having user data region and protect region in Embodiment 1 of the invention.
FIG. 12B is a diagram showing an example of region information storage section having user data region and protect region in data recording region in Embodiment 1 of the invention.

To reinforce copyright protection, as shown in FIG. 12A, each divided recording region in the information recording medium 110 is separated into a region (user data region) allowing access by general users, and a region (protect region) limited in access by general users and for storing data safely and securely.

The protect region is a region allowing access only when the information processing apparatus 100 and information recording medium 110 are mutually validated to be authorized by mutual validation process of exchanging mutual identification information between the information processing apparatus 100 and information recording medium 110. For example, music data is encrypted and stored in user data region, and the encrypting key is stored in the protect region, so that the protect region is used for protection of the copyright of digital contents of music data.

In this case, since the decoding clue of encrypted data stored in the user data region is stored in the protect region, if the user data region is further divided into a plurality of regions, the corresponding protect region must be also divided and managed in the same number of divided regions.

FIG. 12B shows an example of a region information storage section 112b in the case of the recording region of the data recording section 114 being divided into a user data region and a protect region.

What differs from the example in FIG. 4 is that two sets of information (402a, 402b) and (403a, 403b) are provided for user data region and protect region, regarding the start region address and region size. The region identification number 401 and validity flag 403 are common to two regions. In the region changeover process, information of two regions is changed over at the same time. That is, in the example in FIG. 12B, the region identified with a region identification number of "1" of which the present validity flag is set to valid ("1") includes a region with a size of 100 MB starting from the beginning of the user data region, and a region with a size of 1 MB starting from the beginning of the protect region. When it changed over to a region of identification number of "2" by the region changeover process, the information processing apparatus becomes to be able to access a region with a size of 30 MB starting from the position of 100 MB from the beginning of the user data region, and a region with a size of 5 MB starting from the position of 1 MB from the beginning of the protect region.

Thus, when the recording region of the data recording section 114 is divided into a user data region and a protect region, by changing over the user data region and protect region as a set, the corresponding relation of encrypted contents and keys can be managed easily.

Initialization process, data access process and others in the user data region and protect region can be managed in the same manner as above described.

In the embodiment of the invention, the region information storage section 112 manages four types of information including a region identification number, a start region address, a region size and a validity flag as a set, but the data may be compiled in other format as far as the position and size of each region and the presently valid region can be identified. For example, if each region is defined to be always consecutive, the information of region starting address can be omitted. In the command such as Area_Change or Read, information other than the arguments mentioned in the embodiment may be also given as arguments. In the initialization process, the validity flag of the first region is set valid, but other special command may be provided to specify a region to be set in the first place in initialization process from the information processing apparatus 100. In the data read process, an error occurs when accessed to a region exceeding a valid region. However even if accessing a region exceeding the valid region, it may be designed to allow the exceeding region to be read as long as data can be read out from the exceeding region.

EMBODIMENT 2

Figure 13:
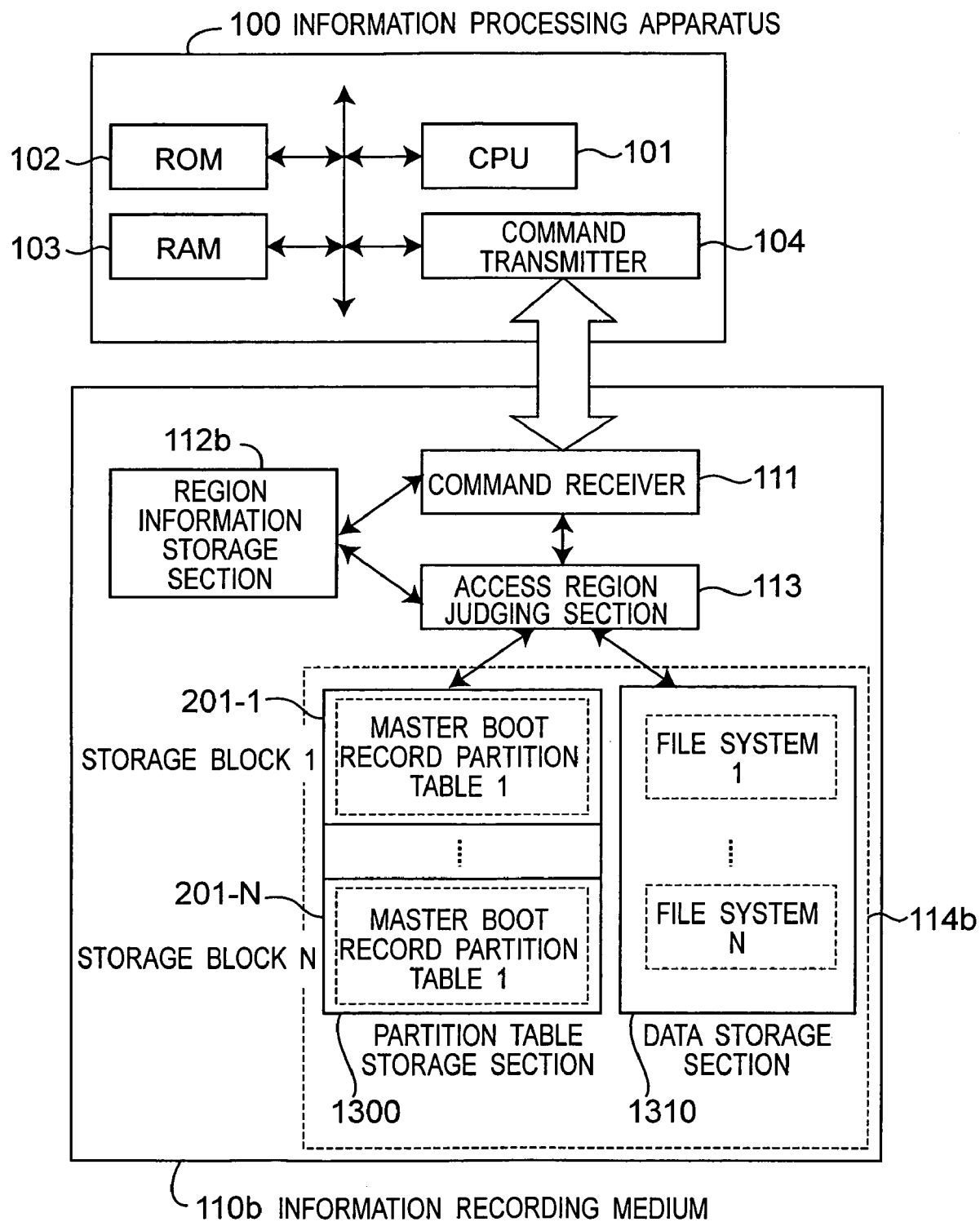
FIG. 13 is a block diagram of information processing system including information processing apparatus and information recording medium in Embodiment 2 of the invention.

FIG. 13 is a block diagram of information processing system comprising information processing apparatus and information recording medium in embodiment 2 of the invention. What differs from the configuration in the embodiment 1 (see FIG. 1) is that an information recording medium 110b includes a partition table storage section 1300 and a data storage section 1310 in a data recording section 114b.

The partition table storage section 1300 includes a plurality of master boot record partition tables 201-1, . . . , 201-N for managing a plurality of regions, called partitions, into which the data recording region of the data recording section 114b is divided.

The master boot record partition tables 201-1, . . . , 201-N are identical with the master boot record partition table 201 stored at the beginning address of the data recording section 114 shown in FIG. 2. That is, the partition table storage section 1300 is for managing master boot record partition tables 201 which are extracted from the management information region 200 and collected at one place, in the file system shown in FIG. 1 or FIG. 2. The data storage section 1310 may store all information stored in the data recording section 114 shown in FIG. 1, or store only the portion removing master boot record partition table 201 from all information.

Figure 14:
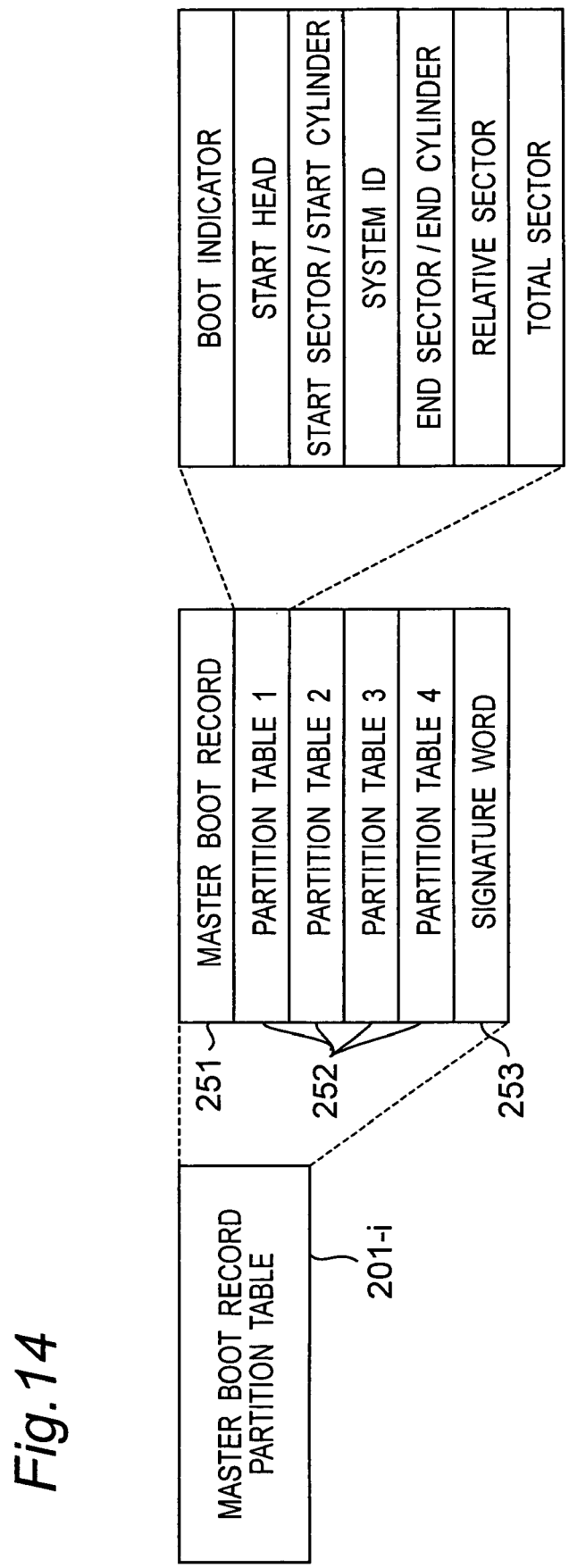
FIG. 14 is a diagram showing master boot record partition table.

The master boot record partition tables 201-i (i=1, 2, ..., N) are stored in the data recording region of fixed length of usually 512 bytes, and store partition tables as information about the region management used by the file system. FIG. 14 shows a structure of master boot record partition table. As shown in the diagram, the master boot record partition table 201-i includes a master boot record 251, four partition tables 252, and a signature word 253.

The master boot record 251 is disposed at the beginning of the data recording region, and stores boot strap codes to start up an operating system stored in the information recording medium.

The partition table 252 is a region for storing information such as starting position and size of each partition existing in the data recording region, and can store four types of partition information.

The signature word 253 is a region for storing a symbol showing terminal end of region storing the master boot record partition table 201-i (i=1, 2, ..., N), and usually stores two bytes of 0x55AA.

The partition table 252 is composed of a boot indicator storing a flag judging whether the partition is used for boot or not, start head/start sector/start cylinder showing partition starting position, system ID storing a flag determined by capacity or file system type, end head/end sector/end cylinder showing the end position of partition, relative sector showing the partition start position by the number of sectors from the beginning of the data recording region and total sector showing the size of partition by the number of sectors.

In this manner, the partition table 252 stores information about a partition start position and a size, and thus the position of a region in which each partition is assigned can be recognized.

In the embodiment, in the partition table storage section 1300, the master boot record partition tables are managed or controlled centrally, and the access region from the information processing apparatus 100 can be changed over by changing over the master boot record partition table to be referred to at the time of data access.

(Region Management Operation)

Region management method in the embodiment is explained.

FIG. 15A to FIG. 15C are diagrams showing data structure examples of the region information storage section 112b, the partition table storage section 1300, and the data storage section 1310 in the embodiment.

The partition table storage section 1300 is composed of N storage blocks, and each storage block has a fixed length of 16 kB. Each storage block stores a master boot record partition table describing information about a partition existing in a different region.

The data storage section 1310 has its region divided into a plurality of partitions, and a different system is constructed in each partition. Each master boot record partition table stored in the partition table storage section 1300 corresponds to each partition in the data storage section 1310.

The region information storage section 112b is composed of the following six types of information.

1) Start Address of Partition Table Storage Section

Address (physical address) of the beginning position of the partition table storage section 1300 is stored. In the example in FIG. 15A, the partition table storage section 1300 starts from address 1024 MB.

2) Block Size of Partition Table Storage Section

Size of one storage block existing in the partition table storage section 1300 is stored. In the example in FIG. 15A, size of storage block is 16 kB. Each storage block stores information of each master boot record partition table.

3) Block Number of Partition Table Storage Section

The number of storage blocks existing in the partition table storage section 1300 is stored. In the example in FIG. 15A, there are N storage blocks.

4) Start Address of Data Storage Section

Address (physical address) of the beginning position of the data storage section 1310 is stored. In the example in FIG. 15A, the data storage section 1310 starts from address 0.

5) Size of Data Storage Section

Size of the data storage section 1310 is stored. In the example in FIG. 15A, size of the data storage section 1310 is 1024 MB.

6) Valid Block Number

Block number of the storage block which is presently valid in a plurality of storage blocks existing in the partition table storage section 1300 is stored. In the example in FIG. 15A, the first storage block of the partition table storage section 1300 is valid.

Figure 16:
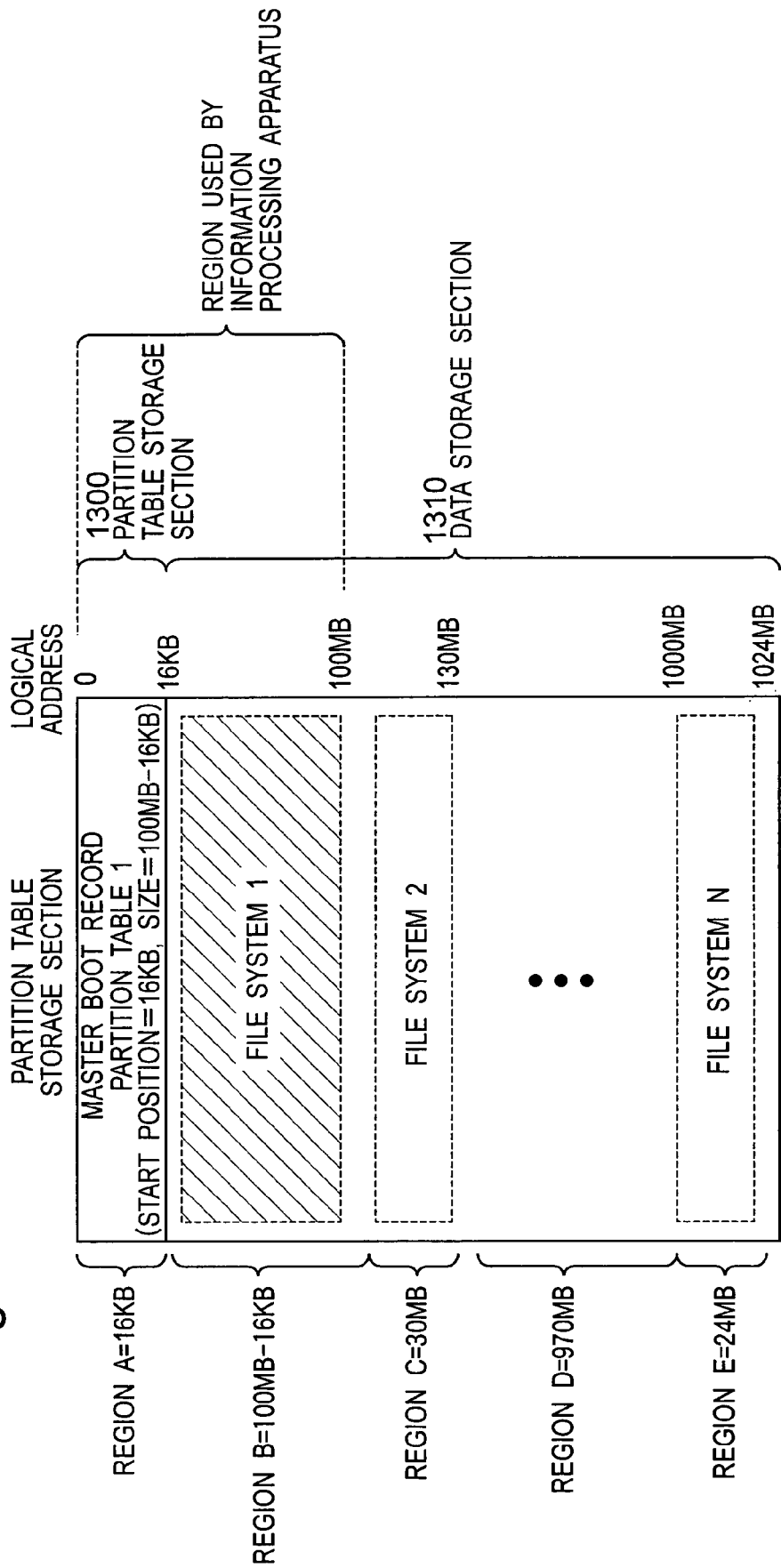
FIG. 16 shows an example of data layout of logical address space of information recording medium in Embodiment 2 of the invention (in the case of valid block number=1).

Next referring to FIG. 16, the address layout of the information recording medium accessible from the information processing apparatus is explained. The information processing apparatus arranges data of the partition table storage section 1300 and the data storage section 1310 shown in FIG. 15B and FIG. 15C as shown in FIG. 16, respectively. FIG. 16 shows a physical address space of the information recording medium 110b recognized by the information processing apparatus 100.

In FIG. 15A, the valid block number is 1. Thus as shown in FIG. 16, the first storage block of the partition table storage section 1300 that stores a master boot record partition table 1 is disposed at the beginning of logical address space, that is, in region A of logical address 0 to 16 kB. The data region is consecutive to the first storage block, and is disposed in region B, region C, region D, and region E, starting from the position of address 16 kB. The information processing apparatus 100 operates various processes on the information recording medium by using the logical address in the logical address space as shown in FIG. 16.

The information processing apparatus 100 reads out the information of partition table existing in logical address 0, and recognizes the region in which the file system is constructed. In the example in FIG. 16, the master boot record partition table 1 is disposed at the beginning of logical address space, and the information processing apparatus 100 accesses a file system 1 stored in region B because the master boot record partition table 1 stores the information showing region B, and executes data reading and writing. That is, in the example in FIG. 16, the information processing apparatus 100 accesses region A and region B.

Figure 17:
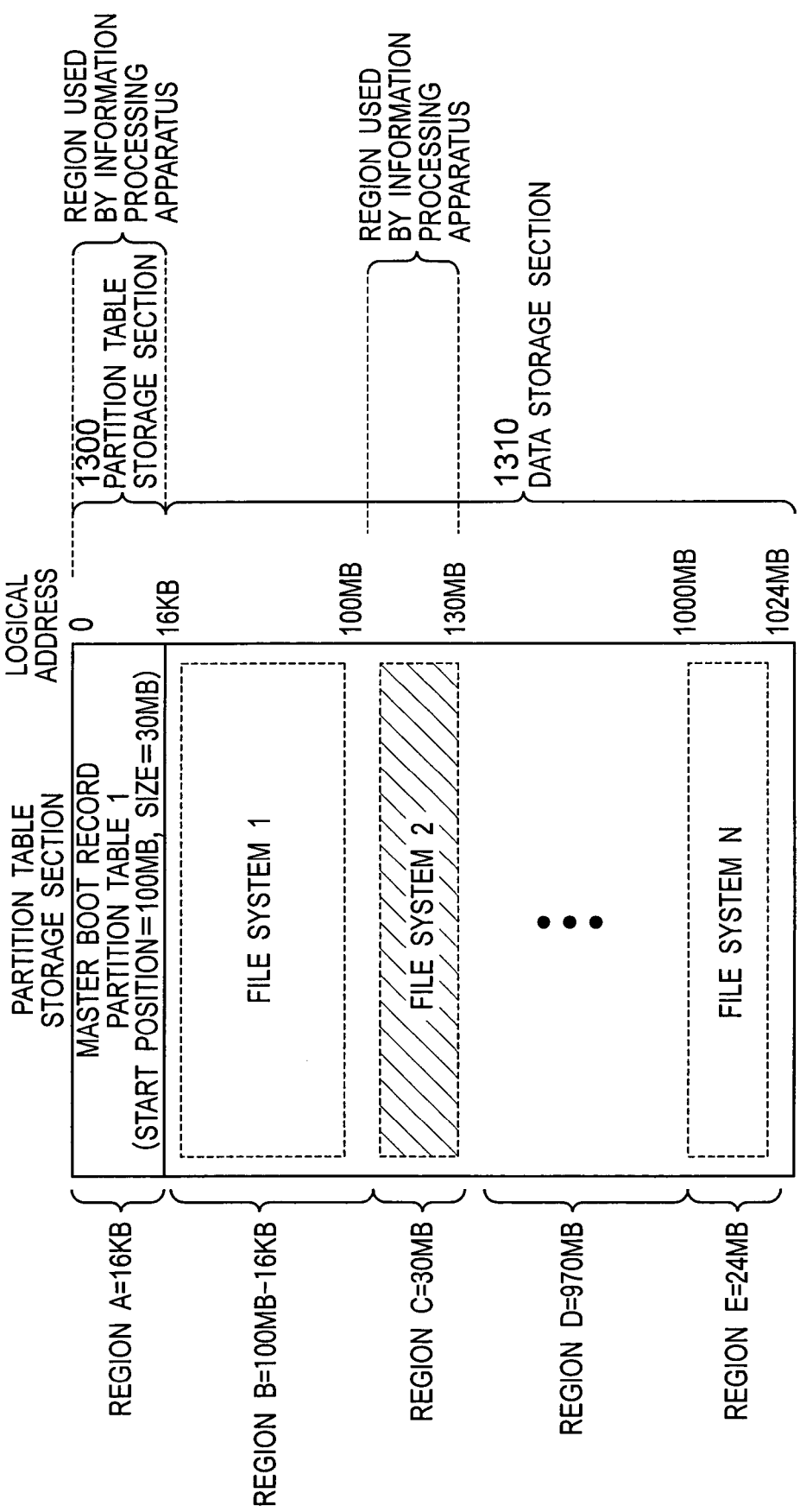
FIG. 17 shows an example of data layout of logical address space of information recording medium in Embodiment 2 of the invention (in the case of valid block number=2).

FIG. 17 shows a layout example in logical address space as seen from the information processing apparatus 100 when the storing valid block number is 2. In FIG. 17, a master boot record partition table 2 is disposed at the beginning of logical address space, and master boot record partition table 2 stores information showing region C, and hence the information processing apparatus 100 accesses file system 2 stored in region C, and executes data reading and writing. That is, in the example in FIG. 17, the information processing apparatus accesses region A and region C.

Thus, by changing over the storage blocks storing partition tables by using the valid block number, only one specific partition can be used, out of a plurality of partitions in which different file systems existing in data regions are constructed. As a result, the information processing apparatus 100 can use the information recording medium 110b while selecting a region that stores the file system which the information processing apparatus 100 can interpret.

(Initialization Process)

Figure 18:
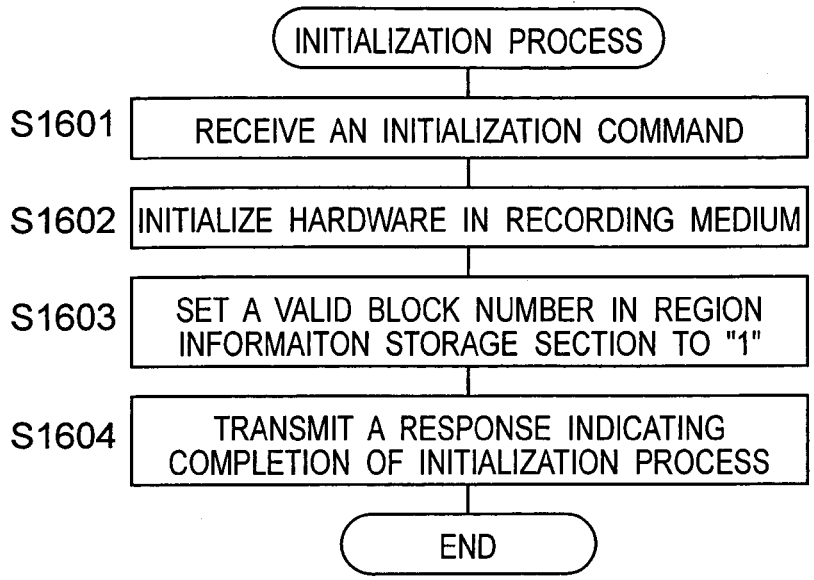
FIG. 18 is a flowchart of initialization process in Embodiment 2 of the invention.

Initialization process of the information recording medium 110b in the embodiment is explained. When the information recording medium 110b is connected to the information processing apparatus 100, the information processing apparatus 100 sends an initialization command to the information recording medium 110b to initialize the information recording medium. FIG. 18 is a flowchart showing the flow of initialization process of information recording medium.

In the initialization process, first, the command receiver 111 of the information recording medium 110b receives an initialization command from the information processing apparatus 100 (S1601).

Next, the recording region of data recording section 114b, other processing sections and register in the information recording medium 110b are initialized, and thus the information recording medium is made ready to be accessed from outside (S1602).

The valid block number included in region information storage section 112b is set to 1 (S1603).

Finally, completion of initialization process is noticed to the information processing apparatus 100 by way of the command receiver 111 of the information recording medium 110b (S1604).

Upon completion of initialization process, the valid block number in the region information storage section 112b is set to 1, and the region accessed from the information processing apparatus 100 referring to the partition table is the first storage block of the partition table storage section 1300.

(Region Changeover Process)

Figure 19:
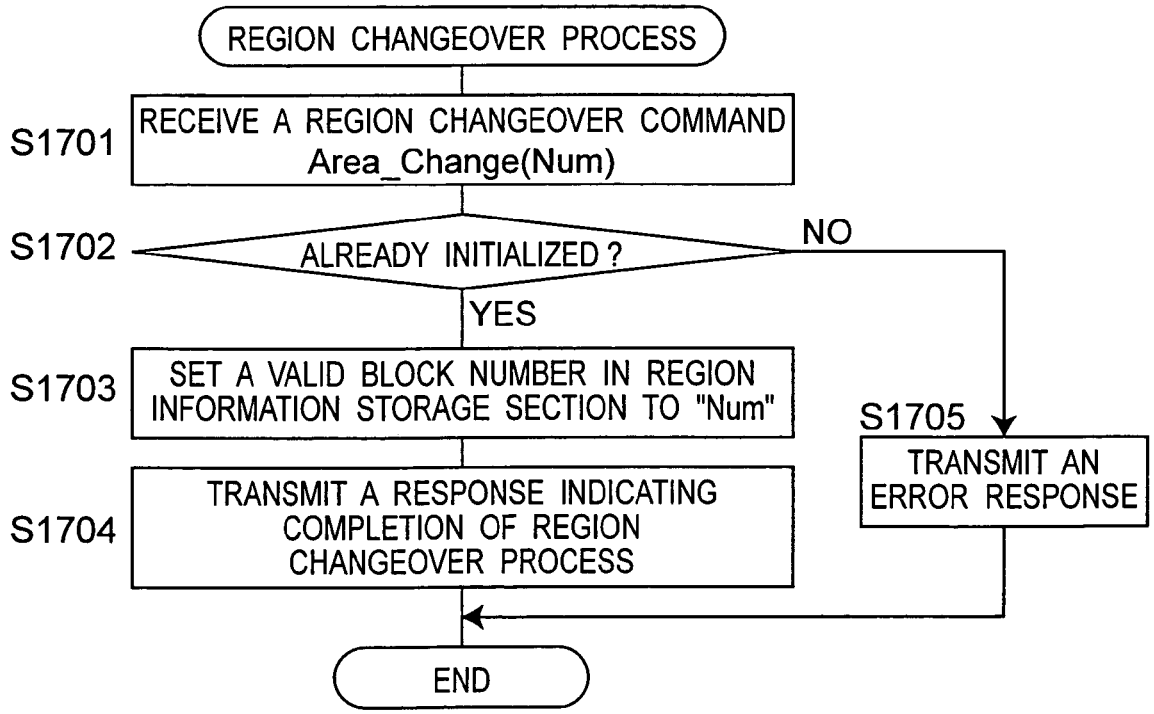
FIG. 19 is a flowchart of region changeover process in Embodiment 2 of the invention.

Region changeover process on information recording medium 110b in the embodiment is described. Region changeover process is executed by transmitting a region changeover command from the information processing apparatus 100 to the information recording medium 110b in which storage block number of the partition table storage section 1300 desired to be valid is specified. FIG. 19 is a flowchart of region changeover process of the information recording medium 110b.

In region changeover process, first, the command receiver 111 of the information recording medium 110b receives a region changeover command from the information processing apparatus 100 (S1701). The region changeover command is expressed, for example, as Area_Change (Num), in which the argument Num sets the storage block number to specify the storage block number of the region desired to be changed over.

Next, it is judged whether the information recording medium 110b has been already initialized or not (S1702). If not initialized, an error response is sent to the information processing apparatus 100 by way of the command receiver 111 of the information recording medium (S1705), and the process is terminated.

If already initialized, the storage block number specified by the region changeover command is set in the valid block number of the region information storage section 112b (S1703).

Finally, completion of region changeover process is noticed to the information processing apparatus 100 by way of the command receiver 111 of the information recording medium (S1704).

After the region changeover process, the partition table storage block specified by the region changeover command is disposed at the beginning of the address space, and the information processing apparatus 100 can access the information of partition table stored in the specified partition table storage block.

(Data Access Process)

Figure 20:
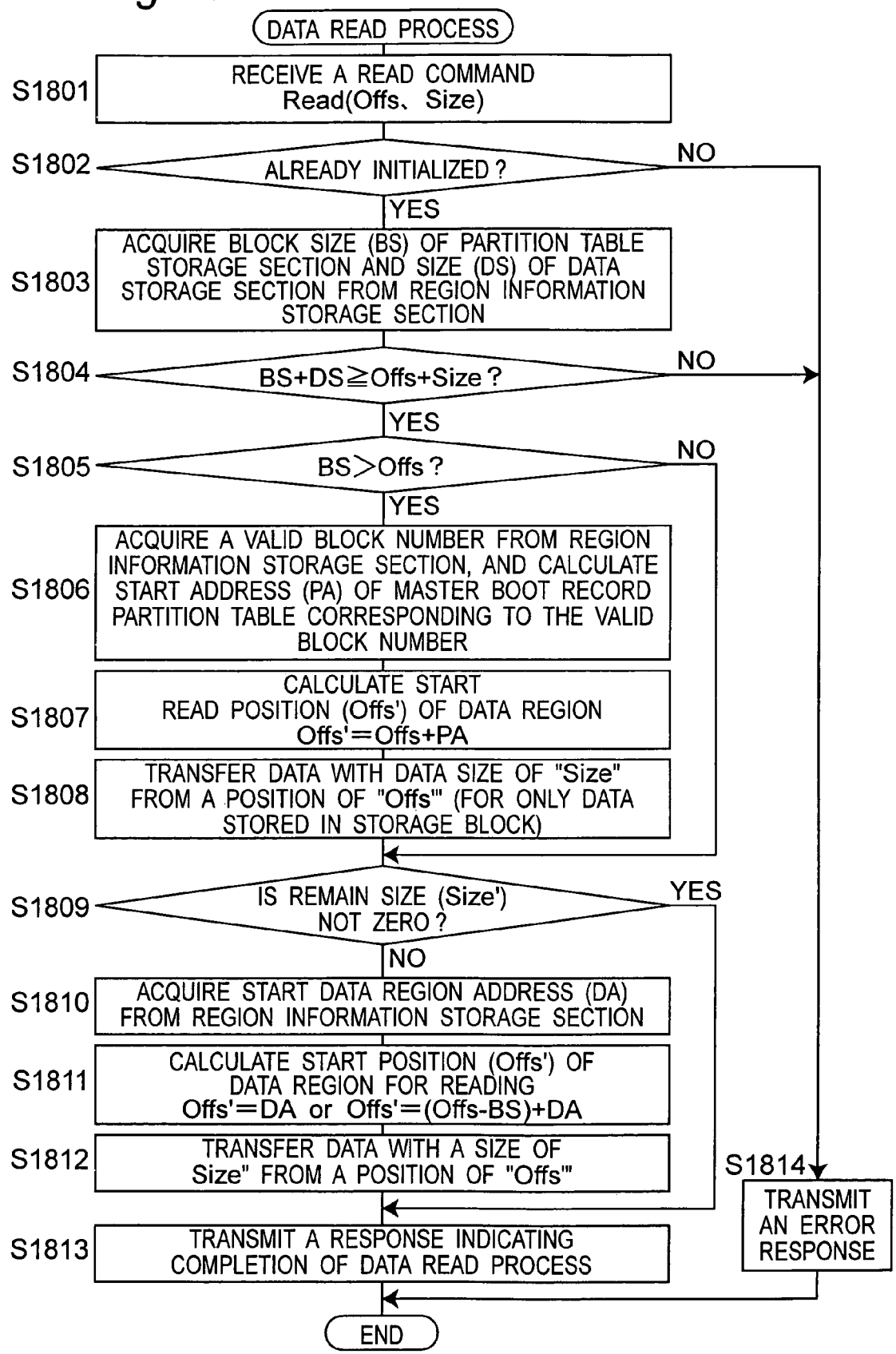
FIG. 20 is a flowchart of data read process in Embodiment 2 of the invention.

Access procedure to information recording medium 110b in the embodiment is explained as an example of data read process. Data read/write from the information recording medium 110b is executed by transmitting data read/writ command to the information recording medium 110b. FIG. 20 is a flowchart of data region process in the information recording medium.

In the data read process, first, the command receiver 111 of the information recording medium 110b receives a data read command from the information processing apparatus 100 (S1801). Data read command is expressed, for example, as Read (Offs, Size), in which the first argument (Offs) specifies read start address and the second argument (Size) specifies read size. The argument Offs specified by the information processing apparatus 100 is address in the logical address space (offset value from the beginning of the logical address space).

It is then judged if the information recording medium 110b has been already initialized or not (S1802). If not initialized, an error response is sent to the information processing apparatus 100 by way of the command receiver 111 of the information recording medium 110b (S1814), and the process is terminated.

If already initialized, the block size (BS) of the partition table storage section and the size (DS) of the data storage section are acquired from the region information storage section 112b (S1803).

The sum of the values of Offs and Size is compared with the sum of BS and DS to confirm whether or not all data read region is included in the accessible region (S1804). If all data read region is not included in the accessible region, that is, in the case of (Offs+Size)>(BS+DS), an error response is sent to the information processing apparatus by way of the command receiver 111 of the information recording medium (S1814), and the process is terminated.

When all data read region is included in the accessible region, that is, in the case of (Offs+Size)≦(BS+DS), in succession, it is judged if the read start position is within the partition table storage block or not (S1805). Specifically, BS and Offs are compared. When Offs is greater than BS, access to the partition table storage block does not occur. In this case, the value of Size is set in the remaining data size "Size'", then the process advances to the step of S1809.

When BS is not less than Offs, access to the partition table storage block occurs. In this case, valid block number, block size of the partition table storage section and start address of the partition table storage section are acquired from the region information storage section 112b. On the basis of the valid block number, start address (PA) of the master boot record partition table corresponding to the valid block number is calculated (S1806). The start address (PA) of the master boot record partition table is determined as follows.

*PA=start address of partition table storage section+ (valid block number−1)×block size of partition table storage section*

Data read start position Offs' is calculated by adding the start position Offs specified by the information processing apparatus to the start address PA of the master boot record partition table (S1807). That is, at this step, the logical address (Offs) specified by the information processing apparatus 100 is converted into the physical address (Offs').

From the position of calculated Offs', data with size equal to Size is read out, and the data is sent to the information processing apparatus 100 by way of the command receiver 111 of the information recording medium 110b (S1808). At this time, if read operation which exceeds terminal end of the partition table storage block occurs, the data up to the terminal end of the partition table storage block is sent to the information processing apparatus 100, and the remaining data size is set in the value of remaining size Size', and the process advances to the step (S1809). If read operation which exceeds terminal end of the partition table storage block does not occur, the value of remaining size Size' is set to 0. The reason why data is read out from the position of offset Offs on the basis of start address PA of the master boot record partition table is because, as shown in FIG. 16 and FIG. 17, the master boot record partition table is disposed at the beginning of the address space of the information recording medium 110b which is recognized by the information processing apparatus 100.

The presence or absence of the remaining size of Size' is checked (S1809). If Size' is 0, all data reading is complete, and the process advances to the step of S1813.

If Size' is not 0, start address (DA) of data storage section 1310 is acquired from the region information storage section 112b (S1810).

Physical address Offs' of data read position is calculated (S1811). This Offs' is the physical address of the information recording medium 110b. Specifically, if Offs is smaller than BS, DA is set as Offs'. If Offs is not less than BS, the value of subtracting BS from Offs and adding DA is set as Offs'. As shown in FIG. 16 and FIG. 17, since the master boot record partition table is disposed at the beginning of logical address space, if Offs is not less than BS, in order to calculate the physical address of the read start position of data region, offset value from the beginning of the data region must be determined by subtracting block size (BS) of the partition table storage section from the read start position (Offs) indicated in logical address, and then the offset value must be added to the physical address (DA) of the start position of the data region.

Next, data of size equal to Size' is read from the Offs' position, and the data is sent to the information processing apparatus by way of the command receiver of the information recording medium (S1812).

Finally, completion of data read process is noticed to the information processing apparatus by way of the command receiver of the information recording medium (S1813).

By this process, in this embodiment, by issuing a region changeover command before access to the data in the information recording medium, the storage block storing the desired partition table can be disposed at the beginning of the data recording region. Hence, when the data storage section is divided into a plurality of partitions and different file systems are constructed in individual regions, the information processing apparatus can select the partition table corresponding to the region in which the file system that can be interpreted by the information processing apparatus is constructed, and access a specific partition in the data storage section.

(Protect Region)

Explanation is made to the case of the recording region of the data recording section 114b of the information recording medium 110b being separated into a region (user data region) allowing access by general users, and a region (protect region) limited in access by general users and for storing data safely and securely.

The protect region is a region allowing to be accessed only when the information processing apparatus 100 and information recording medium 110b are mutually validated to be authorized by mutual validation process of exchanging mutual identification information between the information processing apparatus 100 and information recording medium 110b. For example, music data is encrypted and stored in user data region, and the encrypting key is stored in the protect region, so that the protect region is used for protection of the copyright of digital contents of music data.

In this case, since the decode key of encrypted data stored in the user data region is stored in the protect region, when the user data region is further divided and managed in a plurality of regions, the corresponding protect region must be also divided and managed in the same number of divided regions.

FIG. 21A shows an example of region information storage section in the case of the recording region of the data recording section 114b being divided into user data region and protect region. FIG. 21B shows an example of partition table storage section including a storage block provided in each of user data region and protect region. As shown in FIG. 21B, each partition of user data region is provided to correspond to each partition of protect region.

What differs from the example in FIG. 15A is that two sets of information 2001 and 2002 regarding information other than valid block number are provided for user data region and protect region, in the region information storage section 112c shown in FIG. 21A. In this case, also, two sets of the partition table storage section 1300 and data storage section 1310 are provided for user data region and protect region. The valid block number is information commonly used in partition table storage block for user data region and partition table storage block for protect region. Therefore, when the storage blocks are changed over by region changeover process, storage blocks corresponding to the user data region and protect region in the same data recording region are changed over as a set at the same time.

Thus, when the recording region of the data recording section 114b is divided into user data region and protect region, by changing over the regions as a set of user data region and protect region, relation of encrypted contents and keys can be managed easily.

In the embodiment of the invention, the region information storage section manages by using start address of partition table storage section, size of partition table storage section block, number of blocks of partition table storage section, start address of data storage section, size of data storage section, and valid block number. However the format is not particularly specified as above as far as region position, region size, and presently valid region can be identified. In the command such as Area_Change or Read, other information than the argument mentioned in the embodiment may be also given as argument. Although the first partition table storage block is set as valid block in the initialization process, other special command may be provided so that the storage block set in the first place in initialization process can be specified from the information processing apparatus. In the data read process, an error occurs when access to a region exceeding a valid region occurs, but even if the access exceeds the valid region, it may be designed to allow to read data which can be read out.

In the region changeover process in FIG. 19, when changing over the access region, a region changeover command is issued. However when accessing data while changing over a plurality of regions at the same time, the following process is preferred. For example, the information processing apparatus 100 reads out information in storage blocks for several regions desired to be accessed, from the partition table storage section 1300, and keeps the information in cache. Afterward, when the information processing apparatus 100 accesses the region while changing over a plurality of regions, it refers to the information in cache to acquire the information (start position, size) in the regions to be accessed, and executes the region changeover process. Hence, for region changeover process, it is not required to issue the region changeover command as shown in FIG. 19, and thus overhead in region changeover can be decreased. In this embodiment, the information relating to regions is managed in batch in the partition table storage section 1300, and therefore it is only enough to keep the information of partition table storage section 1300 in cache, and it can be executed realistically. But in the example of dividing the recording region into a plurality of sections and setting up file system in each region as in the embodiment 1, the amount of information to be kept in cache is tremendous and it is not realistic to execute such process.

EMBODIMENT 3

When the information recording medium has an accessible region of specified region size and the information processing apparatus uses a file system not supporting the specified region size of the information recording medium (for example, when the information recording medium is formatted in FAT32 and the information processing apparatus can recognize FAT12/16 only), if the information processing apparatus attempts to access this information recording medium, information in the information recording medium may be broken, or the information processing apparatus may malfunction. This embodiment explains a region management method of information recording medium for preventing such inconvenience.

Figure 22:
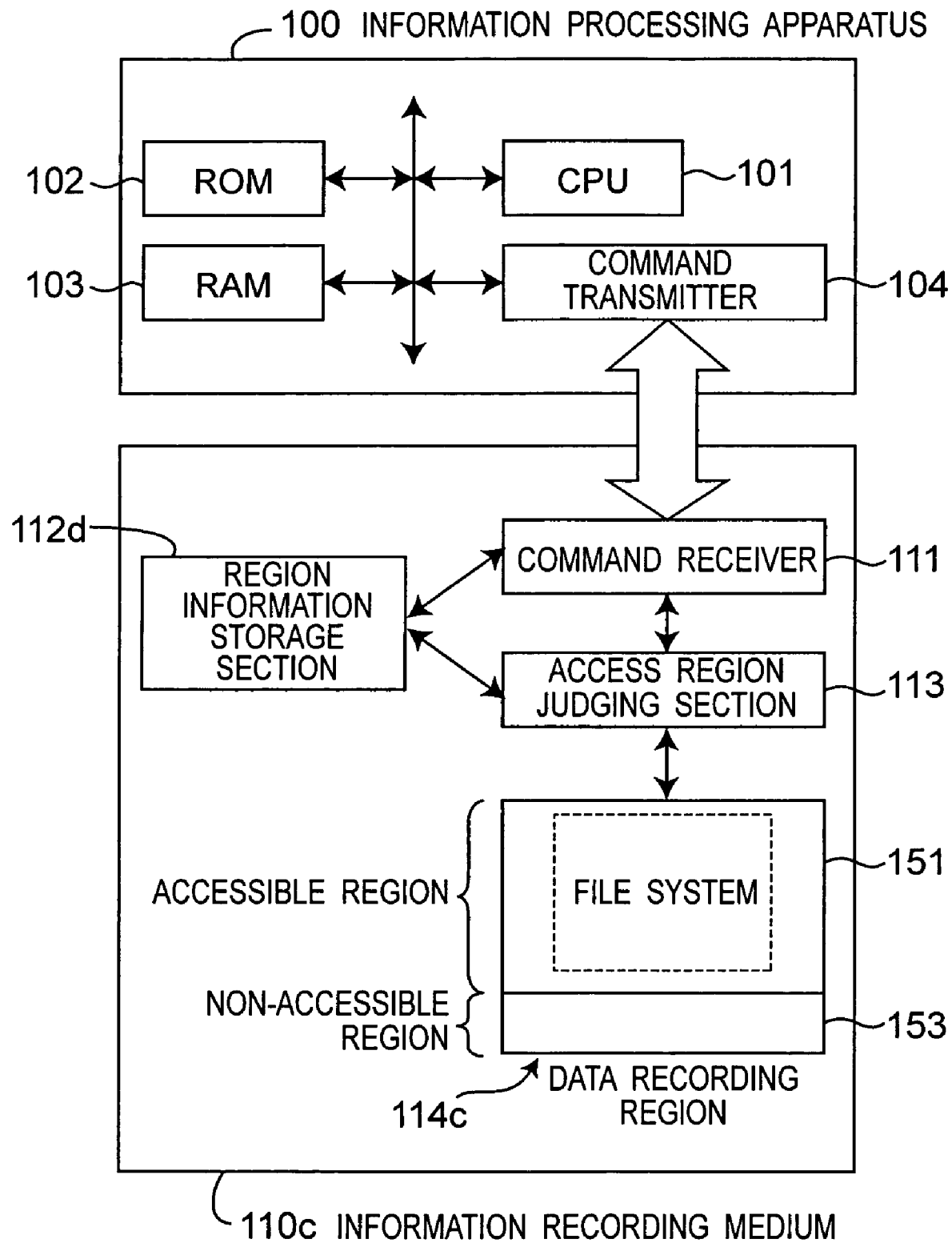
FIG. 22 is a block diagram of information processing system including information processing apparatus and information recording medium in Embodiment 3 of the invention.

FIG. 22 is a block diagram of an information processing system including an information processing apparatus and an information recording medium in embodiment 3 of the invention. In this embodiment, the recording region of a data recording section 114c in an information recording medium 110c includes accessible regions. The accessible regions can be freely set in region size, and file systems corresponding to each region size can be constructed. Regions other than accessible regions are not accessible. Accessible regions can be formatted in a plurality of types of formats by relating the combination of region size and file system of accessible regions to the formats one by one.

That is, in the information recording medium 110c in the embodiment, accessible regions are generated in any one format out of N types of format. The format state (showing region size and file system of formatted accessible region) is specified by "status." For example, status 1 means a format with region size of 2048 MB and file system 1, and status 2 means a format with region size of 4096 MB and file system 2.

Figure 23:
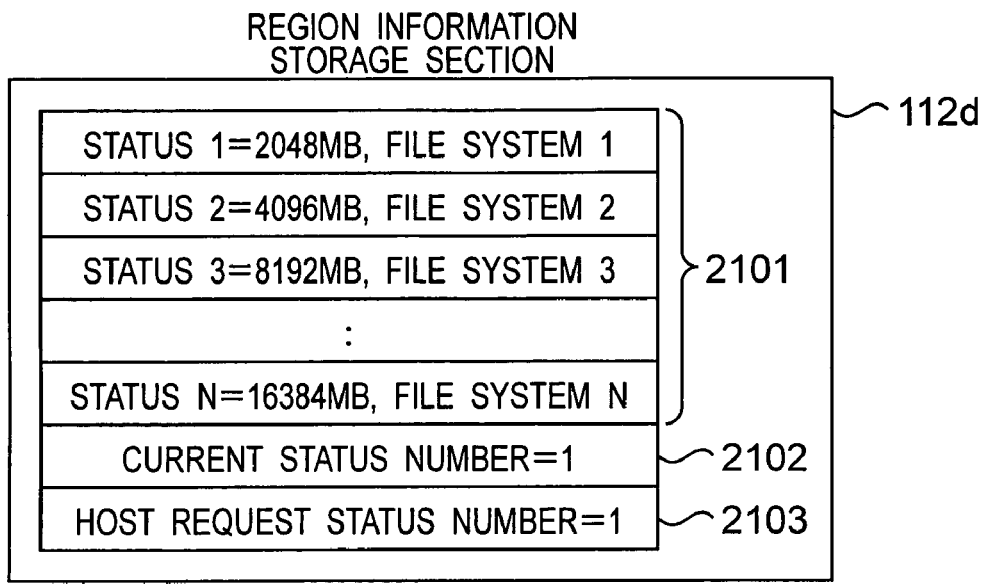
FIG. 23 is a diagram showing an example of region information storage section in Embodiment 3 of the invention.

FIG. 23 is a diagram showing data structure of a region information storage section 112d in the information recording medium 110c in the embodiment.

The region information storage section 112d includes N types of status 2101, current status number 2102, and host request status number 2103. Each status 2101 specifies region size and file system used in formatting. In this embodiment, among statuses, different regions and different file systems are specified, but combination of region size and file system is not particularly specified. The current status number 2102 shows the present status (format state) of the information recording medium 110c. The host request status number 2103 shows the status (format state) of information recording medium 110c requested by the information processing apparatus 100.

When the information processing apparatus 100 accesses the information recording medium 110c having such structure, the information processing apparatus 100 accesses by specifying a status number constructing a file system which can be interpreted by itself. Prior to access, the information recording medium 110c compares the host request status number indicating the status specified by the information processing apparatus 100 with the current status number indicating the status set presently, and permits the access only when the both are matched. By such region management, only when the file system correctly interpreted by the information processing apparatus 100 is constructed in the recording region of the data recording section 114d, the access is permitted by the information recording medium 110c. Hence, even if the file system constructed in the information recording medium 110c is different from the file system correctly interpreted by the information processing apparatus 100, breakage of file system or malfunction of the information processing apparatus 100 can be prevented. Processing on the information recording medium 110c in the embodiment is explained below.

(Initialization Process)

Figure 24:
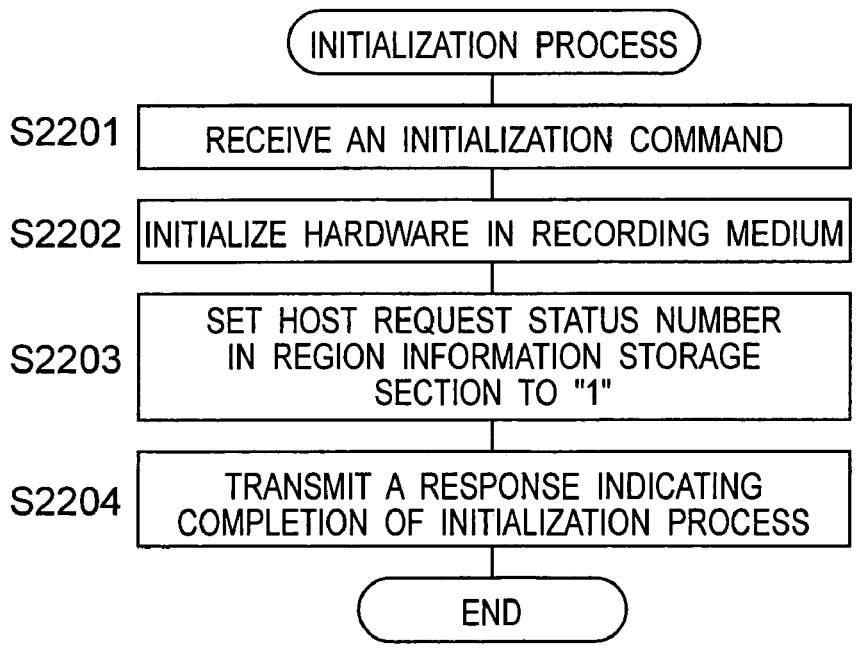
FIG. 24 is a flowchart of initialization process in Embodiment 3 of the invention.

Initialization process of the information recording medium 110c in the embodiment is explained. When the information recording medium 110c is connected to the information processing apparatus 100, the information processing apparatus 100 sends an initialization command to the information recording medium 110c to initialize the information recording medium 110c. FIG. 24 is a flowchart showing initialization process of information recording medium 110c.

In the initialization process, first, the command receiver 111 of the information recording medium 110c receives an initialization command from the information processing apparatus 100 (S2201).

Next, the recording region of the data recording section 114c, other processing sections and register in the information recording medium 110c are initialized, and thus the information recording medium 110c is made ready to be accessed from outside (S2202).

Host request status number included in the region information storage section 112d is set to 1 (S2203).

Finally, completion of initialization process is noticed to the information processing apparatus 100 by way of the command receiver 111 of the information recording medium (S2204).

Upon completion of initialization process, the host request status number in the region information storage section 112d is set to 1. The current status number remains in the same value as set before initialization process. If the previous current status number is 1, after initialization, the host request status number and current status number are matched, and in the information recording medium 110*c*, it is possible to access the data recording region in the size stored in the region size (2048 MB) indicated by status 1.

(Status Changeover Process)

Status changeover process in the information recording medium of the embodiment is explained. Status changeover process is executed by the information processing apparatus 100, prior to formatting, when formatting the data recording region of the information recording medium 110*c*.

In status changeover process, the current status number 2102 of the region information storage section 112*d* of the information recording medium 110*c* is rewritten. This process is executed by sending a status changeover command in which the desired status number is specified from the information processing apparatus 100 to the information recording medium 110*c*. The status number specified herein is number showing type of status used in formatting. For example, for formatting the data recording region of the information recording medium 110*c* by status 3, the number is set to "3".

Figure 25:
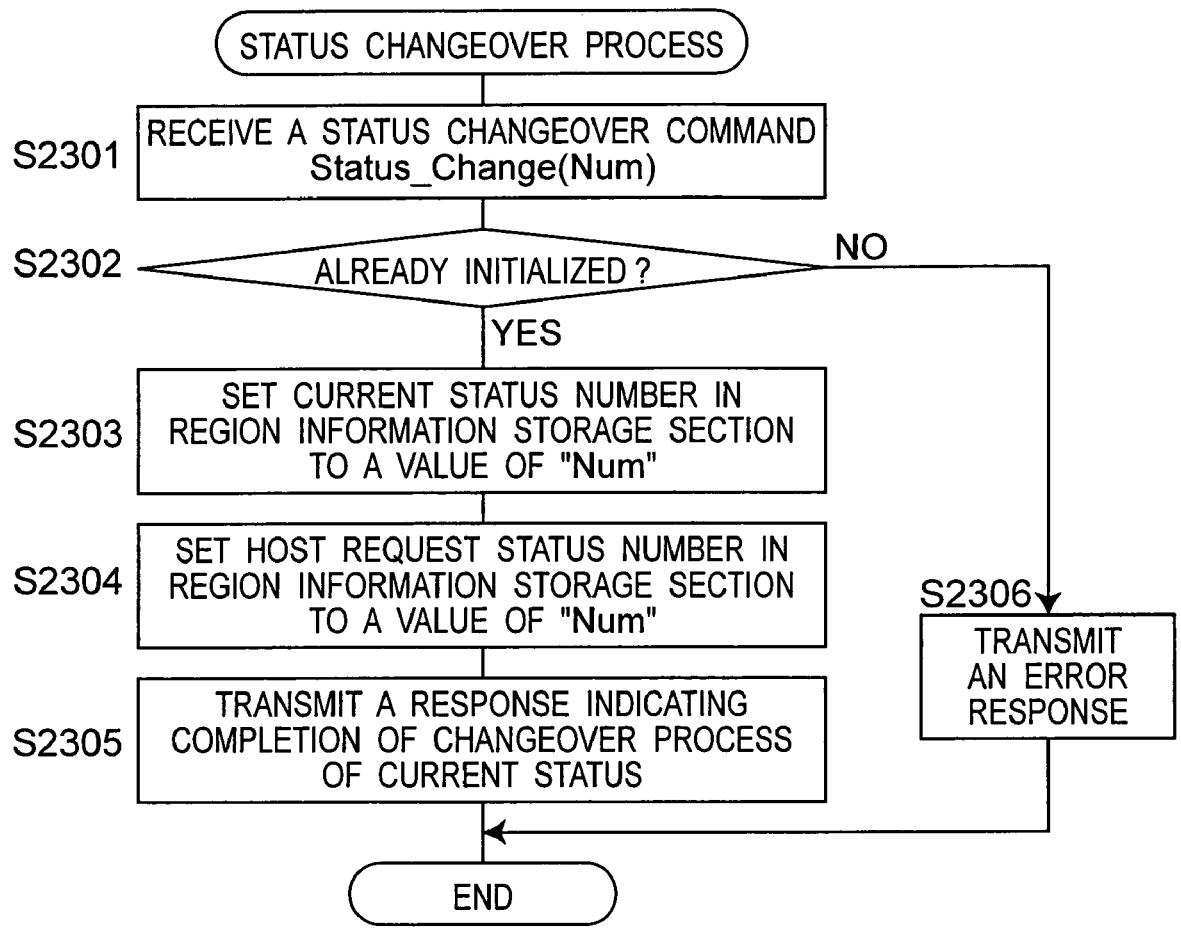
FIG. 25 is a flowchart of current status changeover process in Embodiment 3 of the invention.

FIG. 25 is a flowchart of status changeover process of the information recording medium 110*c*.

In the status changeover process, first, the command receiver 111 of the information recording medium 110*c* receives a status changeover command from the information processing apparatus 100 (S2301). The status changeover command is expressed as Status_Change (Num), and the status number is specified by argument "Num".

It is then judged if the information recording medium 110*c* has been already initialized or not (S2302). If not initialized, an error response is sent to the information processing apparatus 100 by way of the command receiver 111 of the information recording medium 110*c* (S2306), and the process is terminated.

If already initialized, the number specified by the status changeover command is set in the current status number 2102 in the region information storage section 112*d* (S2303).

The same number is also set in the host request status number 2103 (S2304).

Finally, completion of status changeover process is noticed to the information processing apparatus by way of the command receiver of the information recording medium (S2305).

Upon completion of status changeover process, the information processing apparatus 100 formats the information recording medium 110*c*. Hereinafter, until next formatting, the information processing apparatus 100 can access only the region formatted in the status specified in the status changeover process.

(Host Request Status Changeover Process)

Host request status changeover process in the information recording medium of the embodiment is explained. Host request status changeover process rewrites the host request status number 2103 of the region information storage section 112*d* of information recording medium 110*c*. This process is executed by transmitting a host request changeover command in which the requesting status number is specified from the information processing apparatus 100 to the information recording medium 110*c*. This process may be executed only once before access after the information recording medium 110*c* is connected to the information processing apparatus 100, or executed prior to access in every access.

Figure 26:
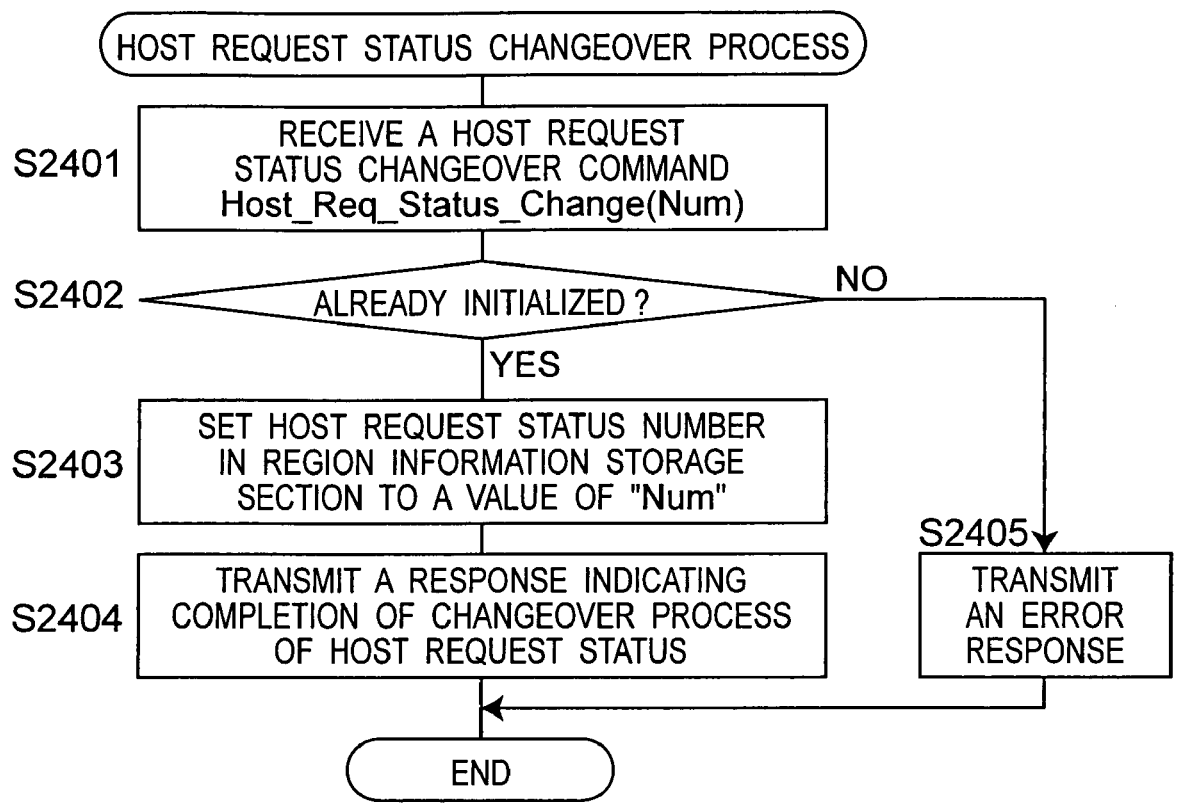
FIG. 26 is a flowchart of host request changeover process in Embodiment 3 of the invention.

FIG. 26 is a flowchart of host request status changeover process of the information recording medium 110*c*.

In this process, first, the command receiver 111 of the information recording medium 110*c* receives a host request changeover command from the information processing apparatus 100 (S2401). The host request changeover command is expressed as Host_Rec_Status_Change (Num), in which the argument "Num" specifies status number to be requested.

It is then judged if the information recording medium 110*c* has been already initialized or not (S2402). If not initialized, an error response is sent to the information processing apparatus by way of the command receiver of the information recording medium (S2405), and the process is terminated.

If already initialized, the number specified by the host request changeover command is set in the host request status number 2103 (S2403).

Finally, completion of host request changeover process is noticed to the information processing apparatus 100 by way of the command receiver 111 of the information recording medium 110*c* (S2404)

The information processing apparatus 100, before accessing the information recording medium 110*c*, processes the host request changeover at least once, so that access to the information recording medium 110*c* can be permitted only when status of a region to be accessed coincides with status indicated by the current status number 2102.

(Data Access Process)

Access process to the information recording medium 110*c* of the embodiment is explained as an example of data read process. Data read/write on information recording medium 110*c* is executed by sending data read/write command to the information recording medium 110*c*.

Figure 27:
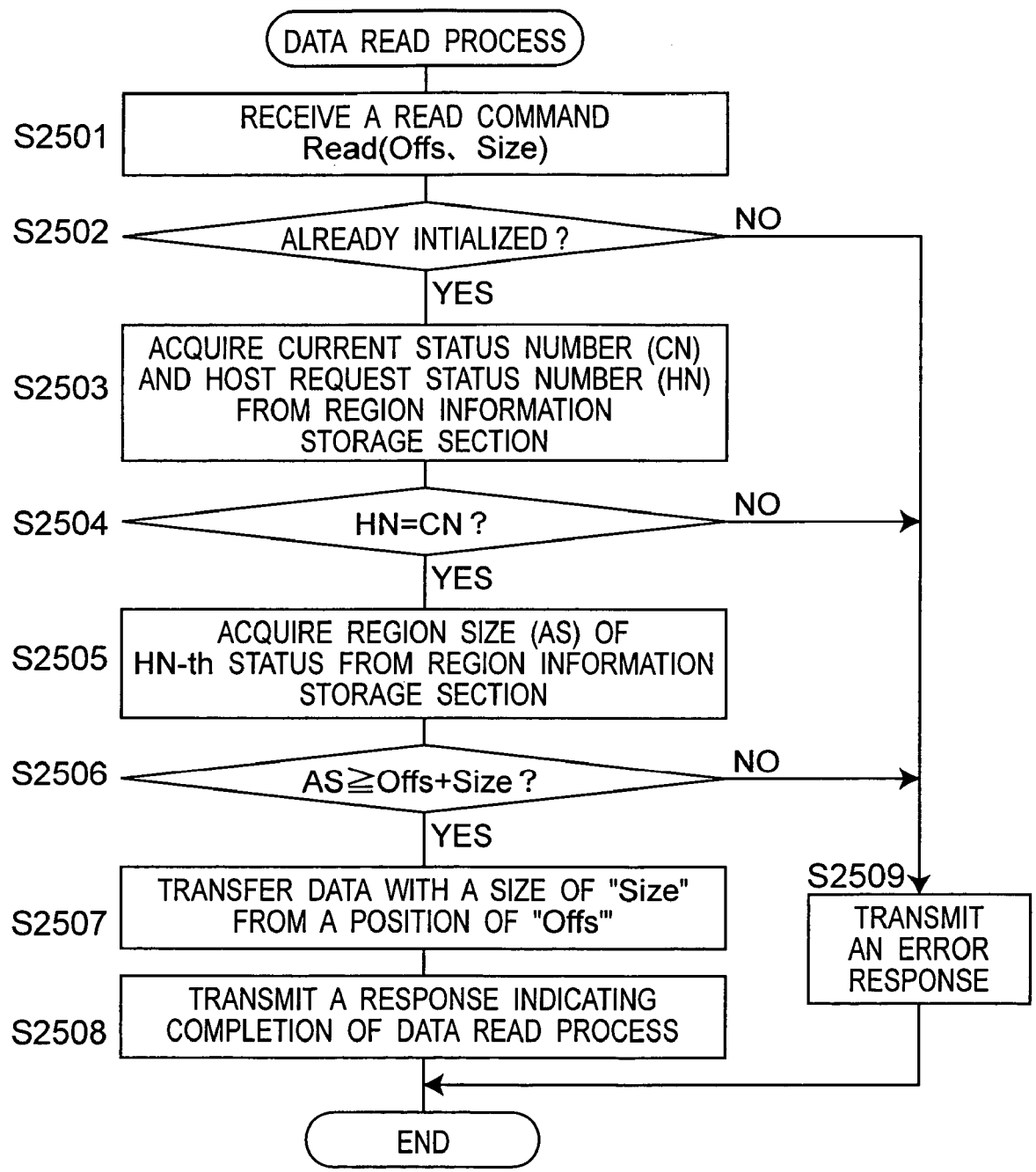
FIG. 27 is a flowchart of data read process in Embodiment 3 of the invention.

FIG. 27 is a flowchart of data read process in the information recording medium 110*c*.

In the data read process, first, the command receiver 111 of the information recording medium 110*c* receives a data read command (for example, Read (Offs, Size)) from the information processing apparatus 100 (S2501).

It is then judged if the information recording medium 110*c* has been already initialized or not (S2502). If not initialized, an error response is sent to the information processing apparatus 100 by way of the command receiver 111 of the information recording medium 110*c* (S2509), and the process is terminated.

If already initialized, the current status number CN and host request status number HN are acquired from the region information storage section 112*d* (S2503).

Next, the acquired current status number CN and host request status number HN are compared (S2504). If not matched, that is, if status (format state) of the information recording medium 110*c* and status of the information recording medium 110*c* requested by the information processing apparatus 100 do not coincide, an error response is sent to the information processing apparatus 100 by way of the command receiver 111 of the information recording medium 110*c* (S2504), and the process is terminated.

Region size AS of status corresponding to host request status number NH is acquired from the region information storage section 112*d* (S2505).

The sum of Offs and Size is compared with the value of AS to judge if whole data read region is included in the accessible region (S2506). If the value of AS is smaller, the data read region is larger than the accessible region, an error response is sent to the information processing apparatus 100 by way of the command receiver 111 of the information recording medium 110*c* (S2509), and the process is terminated.

If the value of AS is larger or equal, data with size equal to Size is read out from the position of Offs, and the data is sent to the information processing apparatus 100 by way of the command receiver 111 of the information recording medium 110*c* (S2507).

Finally, completion of data read process is noticed to the information processing apparatus 100 by way of the command receiver 111 of the information recording medium 110c (S2508).

(Region Size Changing Process)

Explanation is made to procedure of changing (setting) region size of each region in the embodiment. Region size setting process changes (sets) a value of region size 2101 of the region information storage section 112d. This process is executed by transmitting a region size setting command in which status number including region size desired to be set and its size from the information processing apparatus 100 to the information recording medium 110c.

Figure 28:
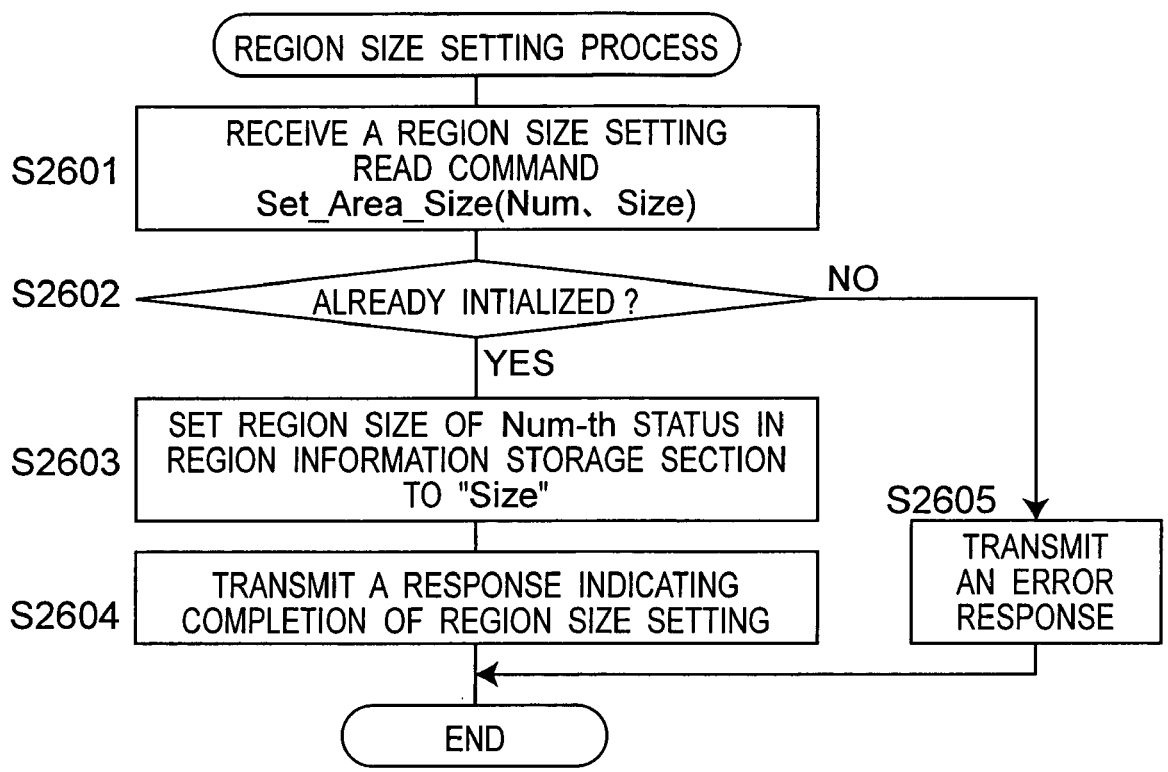
FIG. 28 is a flowchart of region size setting process in Embodiment 3 of the invention.

FIG. 28 is a flowchart of region size setting process in the information recording medium 110c.

In the region size setting process, first, the command receiver 111 of the information recording medium 110c receives a region size setting command from the information processing apparatus 100 (S2601). The region size setting command is expressed, for example, as Set_Area_Size (Num, Size), in which the first argument "Num" specifies region number of a region desired to set and the second argument "Size" specifies region size.

It is then judged if the information recording medium 110c has been already initialized or not (S2602). If not initialized, an error response is sent to the information processing apparatus 100 by way of the command receiver 111 of the information recording medium 110c (S2605), and the process is terminated.

If already initialized, the region size of N-th status (status Num) of the region information storage section 112d is set in Size (S2603).

Finally, completion of region size setting process is noticed to the information processing apparatus 100 by way of the command receiver 111 of the information recording medium 110c (S2604).

In the embodiment, as explained herein, the present status of the information recording medium is compared with status of the information recording medium that is requested by the information processing apparatus, only when they are matched, the information processing apparatus is permitted to access the information recording medium. Thus, only the information processing apparatus capable of correctly interpreting the file system constructed on the information recording medium can access the information recording medium, so that breakdown of file system management information or malfunction of information processing apparatus can be prevented.

(Protect Region)

Explanation is made to the case of the data recording region of the information recording medium 110c being separated into a region (user data region) allowing access by general users, and a region (protect region) limited in access by general users and being capable of storing data safely and securely.

The protect region is as described above. In the protect region, when storing only data of relatively small size such as encrypting key, a single file system for managing small size of the data recording region may be used. In this case, the above region management method of changing over the region size and file system in the accessible region of information recording medium by changing over the status is preferably applied in the user data region only.

However, if a plurality of file systems need to be constructed in the protect region depending on applications, similarly to the user data region, the same region management method may be also applied to the protect region. Region management of two regions of user data region and protect region is explained below.

Figure 29:
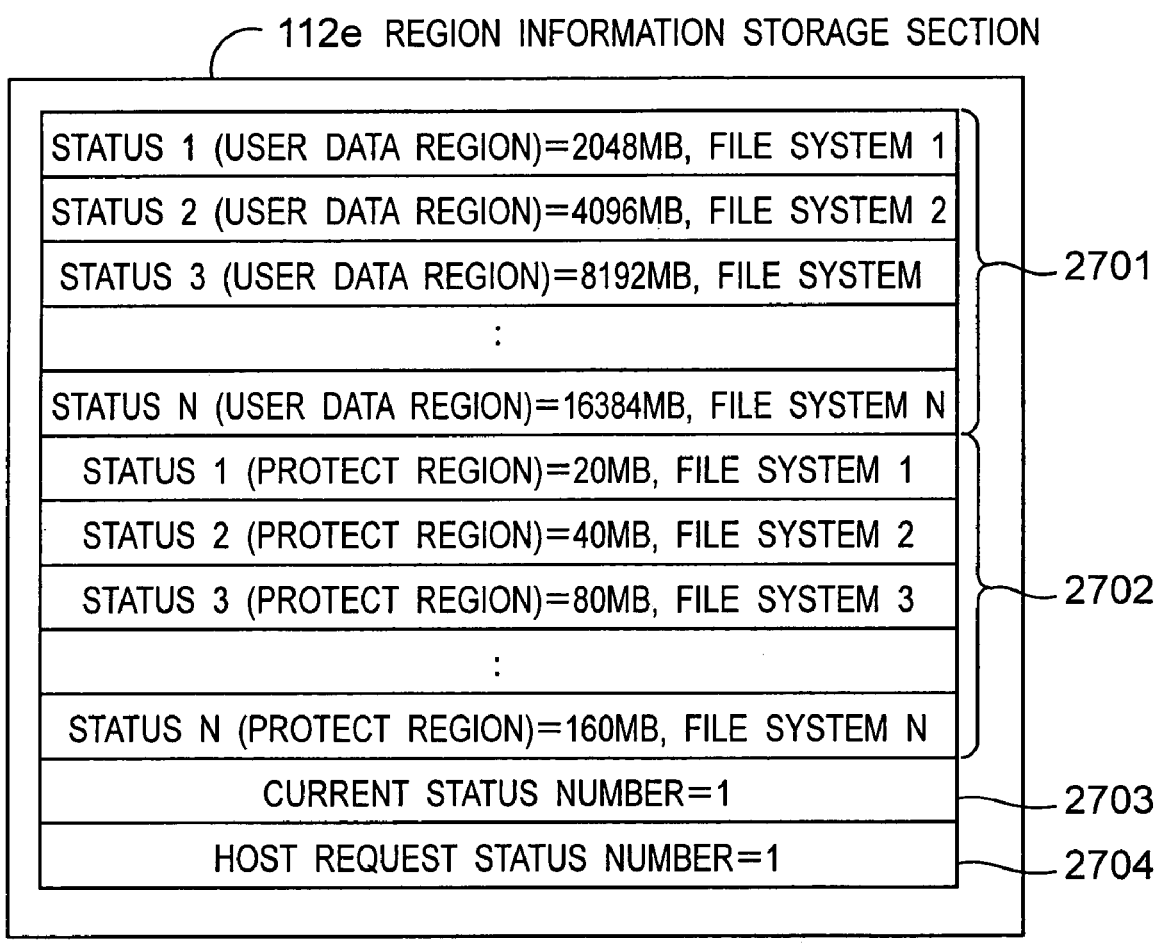
FIG. 29 is a diagram showing an example of region information storage section having user data region and protect region in data recording region in Embodiment 3 of the invention.

FIG. 29 shows an example of a region information storage section 112e in the case of the data recording region being divided into user data region and protect region.

What differs from the example in FIG. 23 is that two sets are present, that is, a status set 2701 for user data region and a status set 2702 for protect region. The status 2701 for user data region corresponds to status 2702 for protect region. When a current status number 2703 and a host request status number 2704 are changed over, the statuses of the corresponding user data region and protect region are change over at the same time, and thus the region size of each region is changed. For example, when the current status number 2703 and host request status number 2704 are both 1, the value of status 1 is referred to, and the region size of user data region is set at 2048 MB, and the region size of protect region at 20 MB. When the current status number 2703 and host request status number 2704 are changed to "2", the value of status "2" is referred to, and the region size of user data region is set at 4096 MB, and the region size of protect region at 40 MB.

Thus, when the data recording region of the information recording medium 110c is divided into a user data region and a protect region, both the user data region and protect region can be managed by a plurality of types of file systems by changeover of the region size in the set of user data region and protect region.

In the embodiment of the invention, the region information storage section manages the region size, current status number, and host request status number, but the format is not particularly specified as above. The other format may be used as far as the region size and presently valid region can be identified. In the command such as Status_Change or Read, other information than the argument mentioned in the embodiment may be also given as argument. In the initialization process, the host request status number is set to 1, but other special command may be provided so that the status number set in the first place in initialization process may be specified by the information processing apparatus. In the data read process, an error occurs when a region exceeding a valid region is accessed, but it may be designed to allow to read data which can be read out even if a region exceeding a valid region is accessed.

EMBODIMENT 4

If there is an information processing apparatus capable of issuing read/write command to an information recording medium for a region of up to 2 GB, such an information processing apparatus is capable of accessing normally the information recording medium up to 2 GB and a file system on the information recording medium. However, when capacity of the information recording medium is extended to 4 GB due to subsequent extension of information recording medium, the file system on the information recording medium is constructed to be applicable to a region of 4 GB, while the information processing apparatus remains to be accessible to a region of up to 2 GB only.

Thus, when the accessible region size (2 GB in this example) of the information recording medium recognized by the information processing apparatus is not equal to the region size (4 GB in this example) managed by the file system constructed on the information recording medium, the information processing apparatus may break down the management information of the file system, or malfunction in recording and reproducing operation.

For example, suppose that the information processing apparatus can recognize a recording region of 2 GB, and that the information recording medium is formatted by a new file system capable of managing a region of 8 GB. In this case, the information processing apparatus can recognized only up to 2 GB in the recording region of the information recording medium, but, depending on the case, it may logically recognize a region of 8 GB. In this case, the information processing apparatus can logically recognize a region exceeding 2 GB, but actually it cannot access physically. That is, by mistake, if the information processing apparatus physically access a region exceeding 2 GB, the data in the accessed region cannot be read out, and it results in an error, or the data in the region exceeding 2 GB may be broken.

To solve such a problem, the embodiment permits an access to the data recording region only when a specific command is issued to the information recording medium. Thus access from an information processing apparatus not knowing the specific command can be cut off, thereby preventing breakdown of management information of the file system or malfunction of the information processing apparatus.

The information processing apparatus and information recording medium of the embodiment are described below with reference to FIGS. 30 to 33.

Figure 30:
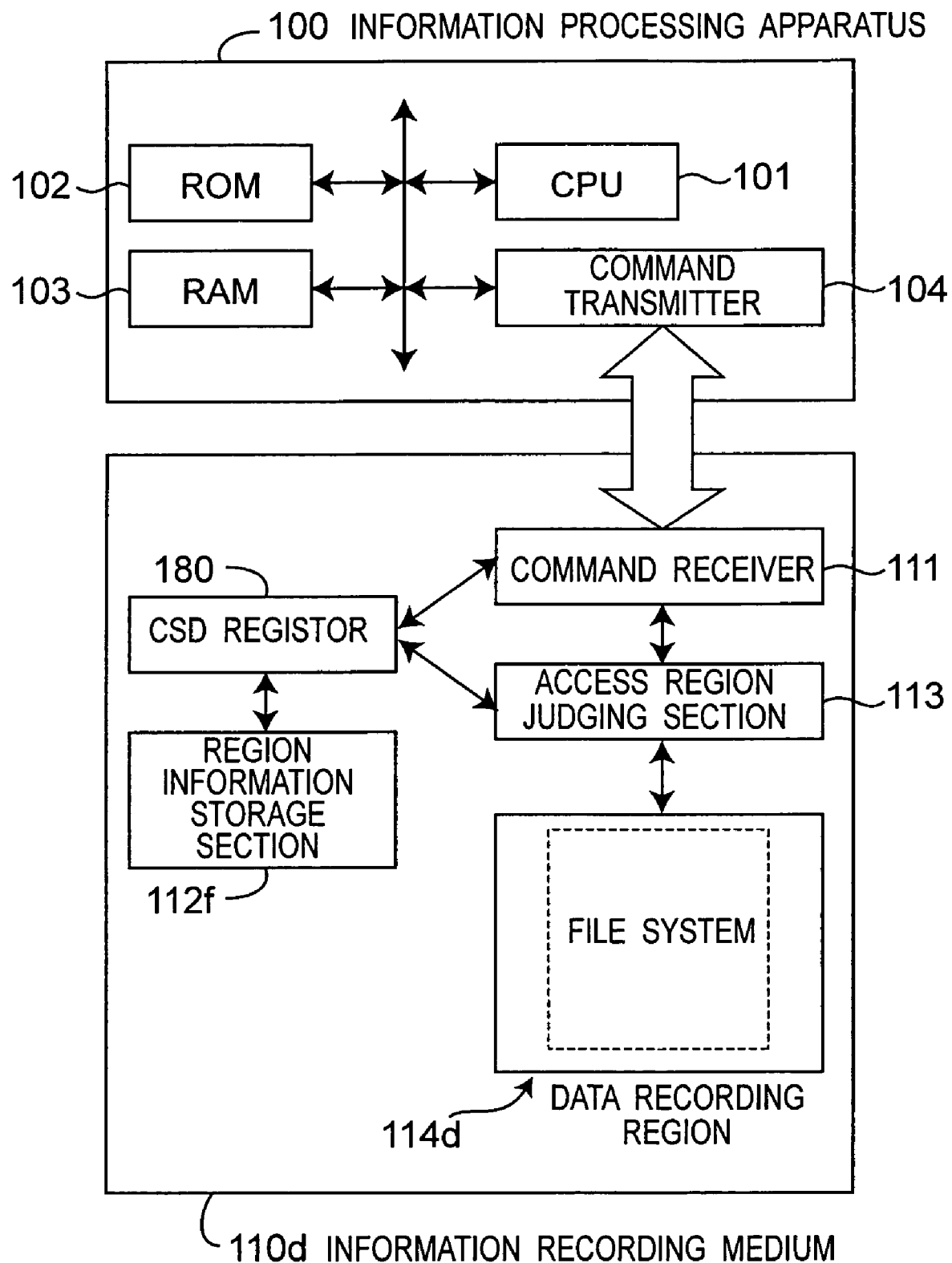
FIG. 30 is a block diagram of information processing system comprising information processing apparatus and information recording medium in Embodiment 4 of the invention.

FIG. 30 is a block diagram of an information processing system including an information processing apparatus and an information recording medium in this embodiment. What differs from the configuration (FIG. 1) in embodiment 1 is that the recording region of a data recording section 114d of an information recording medium 110d is managed as one region in which a file system is constructed, and that a CSD register 180 is provided for storing information such as capacity of the data recording region.

The information recording medium 110d is implemented with the CSD register 180 as means for recognizing size of the recording region of the data recording section 114d for the information processing apparatus 100. The information processing apparatus 100 can acquire the size of recording region of the data recording section 114d by referring to the CSD register 180. For example, in SD (secure digital) memory card (registered trademark) using a semiconductor memory, information about size of the data recording region is stored in a CSD (card-specific data) register from which data can be read by the information processing apparatus. Examples of information about the data recording region size include C_SIZE, C_SIZE_MULT and READ_BL_LEN. C_SIZE, C_SIZE_MULT and READ_BL_LEN are specified parameters for determining region size, the recording region size Total (bytes) is calculated from these values in the following formula (1).

$$\text{Total}=(C\_SIZE+1)\times 2^{(C\_SIZE\_MULT+READ\_BL\_LEN+2)} \quad (1)$$

That is, in this embodiment, the values of C_SIZE, C_SIZE_MULT and READ_BL_LEN are stored in the CSD register 180, and the information processing apparatus 100 reads the CSD register 180 in the information recording medium 110d, calculates the size (Total) of the data recording region in the formula above, and determines the access size to the information recording medium 110d.

A region information storage section 112f in the embodiment is described.

Figure 31:
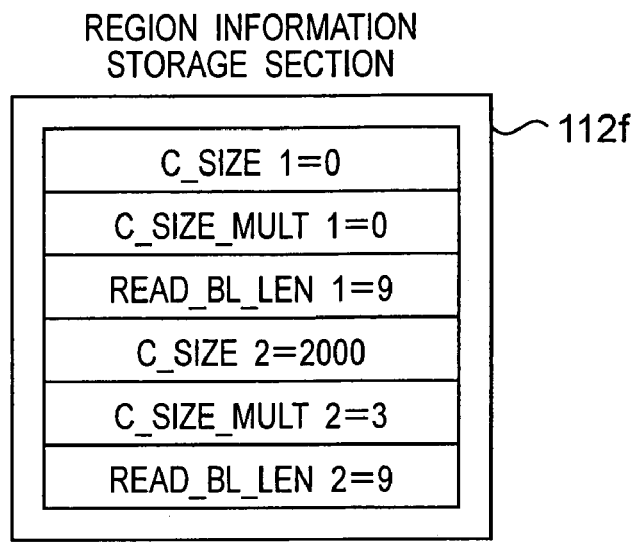
FIG. 31 is a diagram showing an example of region information storage section having user data region and protect region in Embodiment 4 of the invention.

FIG. 31 is a diagram showing the region information storage section 112f in the embodiment. As shown in the diagram, the region information storage section 112f holds two sets of C_SIZE, C_SIZE_MULT and READ_BL_LEN each. One set (C_SIZE1, C_SIZE_MULT1, READ_BL_LEN1) is set in the CSD register 180 at the time of initialization of the information recording medium 110d, and includes a parameter value for providing provisional data recording region size of information recording medium 110d. Other set (C_SIZE2, C_SIZE_MULT2, READ_BL_LEN2) is set after initialization, and includes a parameter value for providing correct data recording region size. The provisional recording region size set at the time of initialization is determined at a smaller value than the actual recording region size of the information recording medium 110d. The values of either of these two sets is stored in the specified field in the CSD register 180 depending on the command from the information processing apparatus 100, and it is ready to read out from the information processing apparatus 100. Processing on the information recording medium 110d of the embodiment is described below.

(Initialization Process)

Figure 32:
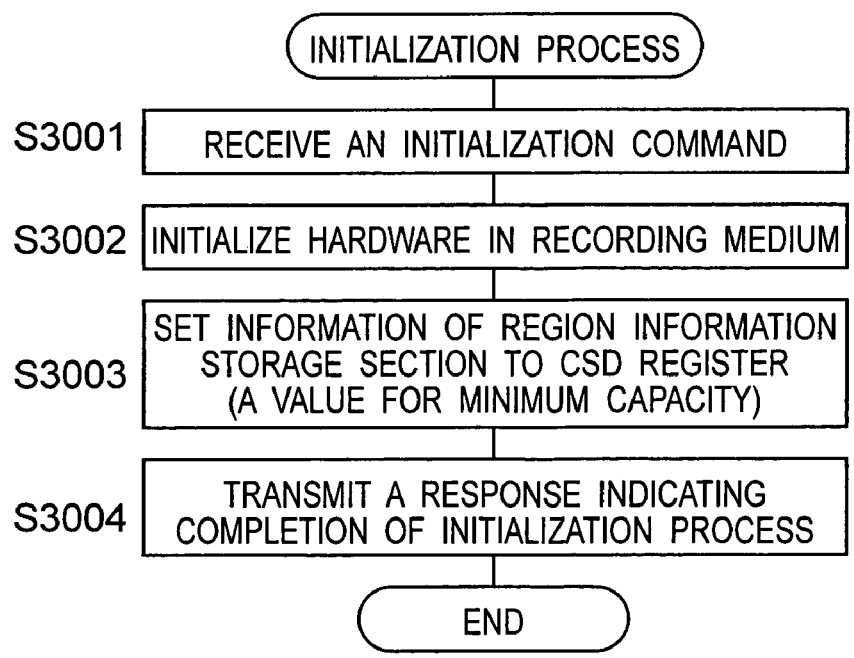
FIG. 32 is a flowchart of initialization process in Embodiment 4 of the invention.

Initialization process of the information recording medium 110d in the embodiment is explained. When the information recording medium 110d is connected to the information processing apparatus 100, the information processing apparatus 100 sends an initialization command to the information recording medium 110d to initialize the information recording medium 110d. FIG. 32 is a flowchart of initialization process in the information recording medium 110d.

In the initialization process, first, the command receiver 111 of the information recording medium 110d receives an initialization command from the information processing apparatus 100 (S3001).

Next, the data recording region and other processing sections in the information recording medium 110d, and registers other than the CDS register 180 are initialized, and the information recording medium 110d is made ready to be accessed from outside (S3002).

Next, C_SIZE1, C_SIZE MULT1, and READ_BL_LEN1 included in the region information storage section 112f are stored in a specified field in the CSD register 180 (S3003).

Finally, completion of initialization process is noticed to the information processing apparatus 100 by way of the command receiver 111 of the information recording medium 110d (S3004).

Upon completion of initialization process, 0, 0, and 9 are set in the fields of C_SIZE, C_SIZE_MULT and READ_BL_LEN in the CSD 180 register, and the data recording region size is calculated as "2K" from formula (1). That is, the information processing apparatus 100 recognizes the capacity of the information recording medium 110d to be 2K bytes upon completion of initialization. The information recording medium 110d also recognizes 2K bytes, and rejects read/write access to regions other than the beginning 2K bytes. However, 2K bytes is not the true region size of the information recording medium 110d. In this embodiment, a region size setting command is used in order to set the region size of the information recording medium 110d correctly to a true value thus to allow to access the information recording medium 110d. Region size setting process by using the region size setting command is explained below.

(Region Size Setting Process)

Figure 33:
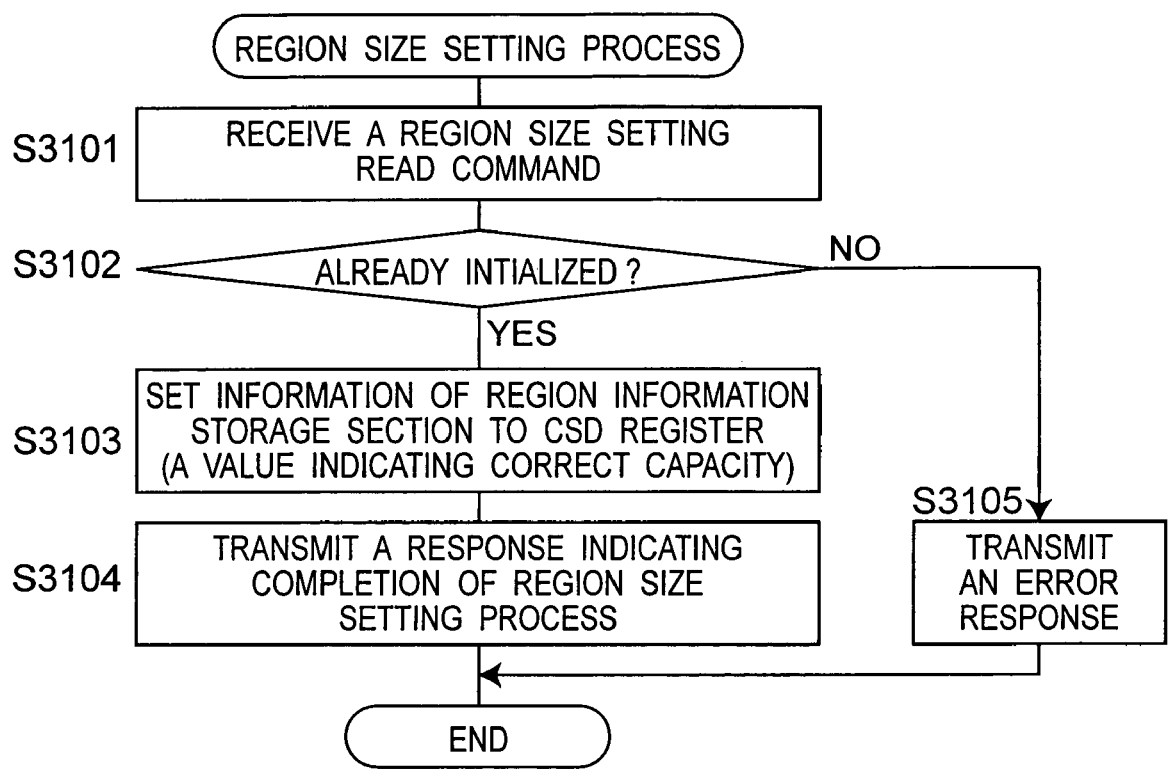
FIG. 33 is a flowchart of region size setting process in Embodiment 4 of the invention.

FIG. 33 is a flowchart of region size setting process in the information recording medium 110d. In this region size changing process, when receiving a region size setting command, the region size of the information recording medium 110d is set to a true value.

In the region size setting process, first, the command receiver 111 of the information recording medium 110d receives a region size setting command from the information processing apparatus 100 (S3101).

It is then judged if the information recording medium 110d has been already initialized or not (S3102). If not initialized, an error response is sent to the information processing apparatus 100 by way of the command receiver of the information recording medium (S3105), and the process is terminated.

If already initialized, values of C_SIZE2, C_SIZE_MULT2, READ_BL_LEN2 included in the region information storage section 112f that provide a true value of region size of the recording region of the information recording medium 110d, are set in corresponding fields in the CSD register 180 (S3103).

Finally, completion of region size setting process is noticed to the information processing apparatus by way of the command receiver of the information recording medium (S3104).

Upon completion of the region size setting process, values showing correct region size of the data recording region are set in C_SIZE, C_SIZE_MULT, READ_BL_LEN of the CSD register. For example, shown in FIG. 31 putting the values of C_SIZE2=2000, C_SIZE_MULT2=3, READ_BL_LEN2=9 into formula (1), 32 MB is obtained as region size. That is, the information processing apparatus 100 can correctly recognize the capacity of the information recording medium 110d upon completion of the region size setting process. The information recording medium 110d similarly can recognize the correct capacity, and allow read/write access within the capacity.

Thus, in the embodiment, upon initialization of the information recording medium 110d, a smaller value than actual recording region size is set in the information about the region size in the CSD register 180, and information showing the correct capacity is set again when issuing a region size setting command. Accordingly, issue of the region size setting command after initialization of information recording medium 110d enables access to the information recording medium 110d to be allowed, thereby preventing malfunction of the information processing apparatus 100 which does not know the region size setting command.

For example, when two types of file systems A and B can be set in the information recording medium, and the file system A can manage a larger region than the file system B, a standard is specified so that, before access, a true recording region size is set by using a specific command, in the information recording medium on which the file system A is constructed. As a result, when an information processing apparatus capable of recognizing only the file system B attempts to access an information recording medium on which the file system A is constructed, since the information processing apparatus does not recognize the specific command to the file system A, the apparatus recognizes the value (minimum value) set at the time of initialization of the information recording medium, as a region size of the information recording medium. Hence, the information processing apparatus does not access by mistake to the region of the information recording medium that cannot be recognized by the file system B, thereby preventing breakdown of management information of the file system B or malfunction in read and write operations.

In the embodiment of the invention, two sets of region information are stored in the region information storage section 112f. However, when region information of specified value can be provided at the time of initialization of the information recording medium 110d, the region information may not be stored in the region information storage section 112f. The size of region set upon initialization of the information recording medium 110d is not limited to 2 kB, but may be set at other small values such as 0 or 16 kB so far as a file system cannot be constructed. Although it is explained as an example that the region size setting command is provided differently from the initialization command, the region size setting process may be included in the initialization process by adding an argument indicating execution of the region size setting to the initialization command.

In this embodiment, too, the information recording medium 110d may include a protect region accessible by a device connected to the information recording medium 110d only when the device is authorized, and a user data region accessible by the device independently of the authorization result. In this case, the information for providing size of the data recording region in the CSD register is set so as to provide size of user data region.

As this invention is described by referring to specific embodiments, but other modifications, corrections and applications are evident for those skilled in the art. Hence the invention is not limited by the specific disclosure herein, but is defined by the scope of the appended claims. This application is related to Japanese Patent Application No. 2003-042859 (filed on Feb. 20, 2003), the entire contents of which are incorporated herein by reference.

INDUSTRIAL APPLICABILITY

The invention can maintain data compatibility among devices and prevent malfunction, even when a plurality of independent file systems are constructed in one information recording medium, and type and number of file systems that can be interpreted by devices are different for each device. The invention therefore is useful in an information processing system for managing data stored in one information recording medium with various file systems.

The invention claimed is:

1. A region management method of an information recording medium, the information recording medium having a data recording region for storing data and a command receiver, the data stored in the recording medium being managed as a file by a file system, the region management method comprising:
    dividing the data recording region into a plurality of recording regions each managed by different file systems individually;
    receiving a changeover command and a data read/write command, for the command receiver, from outside of the information recording medium, the changeover command specifying a region accessible from outside of the information recording medium and the data read/write command specifying a size and an offset of a region to be accessed; and
    selecting one of the divided recording regions according to the received changeover command, as a region accessible from outside of the information recording medium,
    wherein a changeover to a different divided recording region occurs under a control of the received changeover command,
    wherein a plurality of independent file systems areas are disposed on the information recording medium, and the information recording medium is interpreted by different devices having different file systems, wherein data interchangeability between the different devices is provided, and
    wherein, when a region defined by the size and the offset specified by the data read/write command received from outside of the information recording medium exceeds the selected recording region, access to the region specified by the data read/write command is rejected.

2. The region management method according to claim 1, further comprising:
setting a validity flag indicating a region which is presently valid among the plurality of divided recording regions, in the information recording medium; and
referring to the validity flag, prior to access to the data recording region in the information recording medium, to select the one of the divided recording regions to be accessible.

3. The region management method according to claim 2, further comprising setting the validity flag to a specified value when initializing the information recording medium, and setting the validity flag according to the changeover command received thereafter.

4. The region management method according to claim 1, further comprising storing a size of each divided recording region in the information recording medium, and changing the size of each divided recording region according to a size setting command received from outside of the information recording medium.

5. The region management method according to claim 1, wherein the information recording medium is managed by file systems each constructed in each divided recording region and includes a protect region and a user data region, the protect region being accessible by a device connected to the information recording medium only when the device is authorized, the user data region being accessible from the device independently of authorization.

6. A region management method of an information recording medium, the information recording medium having a data recording region for storing data and a command receiver, the data stored in the recording medium being managed as a file by a file system, the region management method comprising:
dividing the data recording region into a plurality of recording regions each managed by different file systems individually;
storing a plurality of storage blocks in a consecutive recording region in the information recording medium, the storage block having constant data size, each storage block storing a partition table which is provided to each divided recording region and is information about a region management which is used by each file system of each divided region;
storing a valid block number indicating a storage block which includes the partition table for a region in the divided recording regions that is accessible from outside of the recording medium;
receiving a changeover command and a data read/write command, for the command receiver, from outside of the information recording medium, the changeover command specifying a valid block number and the data read/write command specifying a size and an offset of a region to be accessed; and
according to the received changeover command, referring to the valid block number, selecting one storage block from the plurality of storage blocks, and determining a partition table for a region to be accessible from outside of the information recording medium,
wherein a changeover to a different divided recording region occurs under control of the received changeover command,
wherein a plurality of independent file systems areas are disposed on the information recording medium, and the information recording medium is interpreted by different devices having different file systems, wherein data interchangeability between the different devices is provided, and wherein, when a region defined by the size and the offset specified by the data read/write command received from outside of the information recording medium exceeds the recording region related to the determined partition table, access to the region specified by the data read/write command is rejected.

7. The region management method according to claim 6, further comprising disposing the partition table included in the selected one storage block at a beginning of logic address space of the information recording medium.

8. The region management method according to claim 6, wherein the partition table includes a start address of the region managed by the file system and a size of the region, and regions specified by the partition tables do not overlap each other.

9. The region management method according to claim 6, wherein
the data recording region is managed by file systems each constructed in each divided recording region, and includes a protect region and a user data region, the protect region being accessible by a device connected to the information recording medium only when the device is authorized, the user data region being accessible from the device independently of authorization, and the information about a region management is provided to the user data region and the protect region, and regarding the same divided recording region, a partition table for the user data region and a partition table for the protect region are managed in pairs.

10. An information recording medium, comprising:
a data recording region which is divided into a plurality of regions, a different file system for managing data stored in each region being constructed in each divided region;
a command receiver for receiving a changeover command and a data read/write command from outside of the information recording medium, the changeover command specifying a region accessible from outside of the information recording medium and the data read/write command specifying a size and an offset of a region to be accessed;
a region information storage that stores a validity flag showing a region in the divided plurality of regions accessible from an external device; and
an access region judger that selects one valid region by referring to the validity flag and allows access to the selected one valid region by the external device,
wherein a changeover to a different divided recording region occurs under a control of the received changeover command,
wherein a plurality of independent file systems areas are disposed on the information recording medium, and the information recording medium is interpreted by different devices having different file systems, wherein data interchangeability between the different devices is provided, and
wherein, when a region defined by the size and the offset specified by the data read/write command received from outside of the information recording medium exceeds the region shown by the validity flag, the access region judger rejects access to the recording region specified by the data read/write command.

11. An information recording medium having a data recording region for recording data, wherein
a) the data recording region is divided into a plurality of recording regions each managed by a different file system, and b) the information recording medium includes:
- a partition table storage that stores a plurality of storage blocks for storing a partition table which is information about a region management used by the file system in each divided region,
- a command receiver that receives a changeover command and a data read/write command from outside of the information recording medium, the changeover command specifying a valid block number and the data read/write command specifying a size and an offset of a region to be accessed,
- a region information storage that stores a valid block number indicating a storage block of the plurality of storage blocks in the partition table storage, the storage block including the partition table which is accessible from an external device, and
- an access region judger that selects one storage block from the partition table storage with reference to the valid block number, and determines the partition table which is accessible from the external device, on the basis of the changeover command received from outside of the information recording medium,
- wherein a plurality of independent file systems areas are disposed on the information recording medium, and the information recording medium is interpreted by different devices having different file systems, wherein data interchangeability between the different devices is provided, and
- wherein, when a region defined by the size and the offset specified by the data read/write command received from outside of the information recording medium exceeds the region related to the determined partition table, the access region judger rejects access to the region specified by the data read/write command.

12. A region management method of an information recording medium having a data recording region for storing data, the data stored in the recording medium being managed as a file by a file system, the region management method comprising:
- receiving a changeover command and a data read/write command, for a command receiver, from outside of the information recording medium, the changeover command specifying a type of size of a data recording region accessible from outside of the information recording medium and the data read/write command specifying a size and an offset of a region to be accessed;
- storing a plurality of types of sizes of the data recording region accessible from outside of the information recording medium; and
- changing over a size of an accessible region according to the changeover command received from outside of the information recording medium,
- wherein a plurality of independent file systems areas are disposed on the information recording medium, and the information recording medium is interpreted by different devices having different file systems, wherein data interchangeability between the different devices is provided, and
- wherein, when a region defined by the size and the offset specified by the data read/write command received from outside of the information recording medium exceeds the accessible region, access to the region specified by the data read/write command is rejected.

13. The region management method according to claim 12, further comprising:
- storing valid region information which is information indicating the size which is presently valid in a plurality of types of sizes of data recording regions accessible from outside of the information recording medium; and
- prior to accessing the data recording region in the information recording medium, recognizing the size of the accessible region by referring to the valid region information, and judging possibility of access.

14. The region management method according to claim 13, further comprising:
- setting the valid region information to one of the plurality of sizes stored, simultaneously with initialization of the information recording medium; and
- setting the valid region information according to changeover command received from outside of the information recording medium.

15. The region management method according to claim 12, wherein the stored size of each region can be changed by a size setting command received from outside of the information recording medium.

16. The region management method according to claim 12, wherein the information recording medium includes a protect region and a user data region, the protect region being accessible by a device connected to the information recording medium only when the device is authorized, and the user data region being accessible from the device independently of authorization.

17. An information recording medium having a data recording region for recording data, comprising:
- a region information storage that stores a plurality of types of sizes of the data recording region accessible from outside of the information recording medium, and valid region information which is information indicating the size which is presently valid in a plurality of types of sizes of data recording regions accessible from outside of the information recording medium;
- a command receiver for receiving a changeover command and a data read/write command from outside of the information recording medium, the changeover command specifying a type of a size of a data recording region accessible from outside of the information recording medium and the data read/write command specifying a size and an offset of a region to be accessed; and
- an access judger that, prior to accessing the data recording region in the information recording medium, recognizes a size of an accessible region by referring to the valid region information, and judges possibility of access,
- wherein a changeover to a different type of size of the data recording region occurs under a control of the received changeover command,
- wherein a plurality of independent file systems areas are disposed on the information recording medium, and the information recording medium is interpreted by different devices having different file systems, wherein data interchangeability between the different devices is provided, and
- wherein, when a region defined by the size and the offset specified by the data read/write command received from outside of the information recording medium exceeds the accessible region, the access region judger rejects access to the region specified by the data read/write command.

18. The information recording medium according to claim 17, wherein a stored size of each region can be changed by a size setting command received from outside of the information recording medium.

19. A region management method of an information recording medium having a data recording region for storing data, the data stored in the recording medium being managed as a file by a file system, the region management method comprising:

storing information providing size of data recording region to a specific register;

receiving a changeover command and a data read/write command, for a command receiver, from outside of the information recording medium, the changeover command specifying information providing size of a data recording region accessible from outside of the information recording medium and the data read/write command specifying a size and an offset of a region to be accessed;

setting the information providing size of data recording region in the register simultaneously with initialization of the information recording medium to a specific value smaller than an actual size of the data recording region; and setting, according to the changeover command received from outside of the information recording medium, the information providing size of the data recording region in the register to an actual size of the information recording medium, wherein a plurality of independent file systems areas are disposed on the information recording medium, and the information recording medium is interpreted by different devices having different file systems, wherein data interchangeability between the different devices is provided, and wherein, when a region defined by the size and the offset specified by the data read/write command received from outside of the information recording medium exceeds the data recording region of which size is provided by the information stored in the register, access to the region specified by the data read/write command is rejected.

20. The region management method according to claim 19, further comprising preventing the information recording medium from receiving the data read/write command from outside of the information recording medium when setting the size of the data recording region in the register to 0 kB.

21. The region management method according to claim 19, wherein the information recording medium includes a protect region and a user data region, the protect region being accessible by a device connected to the information recording medium only when the device is authorized, the user data region being accessible from the device independently of authorization, at this time, the information providing size of data recording region in the register being set to provide the size of the user data region.

22. An information recording medium having a data recording region for recording data, comprising:

a register that stores information providing size of data recording region to a specific register;

a command receiver that receives a changeover command and a data read/write command from outside of the information recording medium, the changeover command specifying information providing a size of a region accessible from outside of the information recording medium and the data read/write command specifying a size and an offset of a region to be accessed; and an access region judger that sets the information providing size of data recording region in the register simultaneously with initialization of the information recording medium to a specific value smaller than an actual size of the data recording region, and sets, according to the changeover command received from outside of the information recording medium, the information providing size of data recording region in the register to an actual size of the information recording medium, wherein a plurality of independent file systems areas are disposed on the information recording medium, and the information recording medium is interpreted by different devices having different file systems, wherein data interchangeability between the different devices is provided, and wherein, when a region defined by the size and the offset specified by the data read/write command received from outside of the information recording medium exceeds the data recording region of which size is provided by the information stored in the register, access to the region specified by the data read/write command is rejected.

\* \* \* \* \*